US012359772B2

(12) United States Patent
Collins et al.

(10) Patent No.: US 12,359,772 B2
(45) Date of Patent: Jul. 15, 2025

(54) CORRUGATIONS FOR INFLATION AGAINST RIGID SHAPE

(71) Applicant: Linamar Corporation, Guelph (CA)

(72) Inventors: Caroline Collins, Sunnyvale, CA (US); Brian Schlotterbeck, San Francisco, CA (US)

(73) Assignee: Linamar Corporation, Guelph (CA)

( * ) Notice: Subject to any disclaimer, the term of this patent is extended or adjusted under 35 U.S.C. 154(b) by 200 days.

(21) Appl. No.: 17/623,476

(22) PCT Filed: Jun. 29, 2020

(86) PCT No.: PCT/US2020/070203
§ 371 (c)(1),
(2) Date: Dec. 28, 2021

(87) PCT Pub. No.: WO2020/264582
PCT Pub. Date: Dec. 30, 2020

(65) Prior Publication Data

US 2022/0356992 A1 Nov. 10, 2022

Related U.S. Application Data

(60) Provisional application No. 62/867,914, filed on Jun. 28, 2019.

(51) Int. Cl.
*F17C 1/16* (2006.01)

(52) U.S. Cl.
CPC ........ *F17C 1/16* (2013.01); *F17C 2201/0138* (2013.01); *F17C 2203/0604* (2013.01); *F17C 2203/066* (2013.01)

(58) Field of Classification Search
CPC ................ F17C 1/16; F17C 2201/0138; F17C 2203/0604; F17C 2203/066;
(Continued)

(56) References Cited

U.S. PATENT DOCUMENTS 4,953,632 A * 9/1990 Sakaya ................. F28D 15/046 29/890.032
4,976,289 A * 12/1990 Umemori ............... B29D 23/18 138/146
(Continued)

FOREIGN PATENT DOCUMENTS

JP 60143982 U 9/1985
JP 2018-519480 A2 7/2018

OTHER PUBLICATIONS

Reasons of Rejection from Japanese patent office for JP2021-577443 mailed May 7, 2024.

*Primary Examiner* — Don M Anderson
*Assistant Examiner* — Eric C Baldrighi
(74) *Attorney, Agent, or Firm* — Miller Canfield

(57) ABSTRACT

A corrugation is provided in a polymeric liner configured for inflation against a rigid shape. The polymeric liner has a cylindrical wall with opposing inner and outer surfaces. The liner includes a first liner section having a plurality of annular corrugations. Each of the corrugations has a curved mountain region with a ridge, a curved valley between adjacent spaced apart mountain regions, and a side wall joining each successive mountain region and valley. A distance between successive ridges defines a period of the corrugations. The wall thickness of the liner at the ridge is greater than the wall thickness at the valley. A radial distance between the ridge and the valley defines an amplitude of the corrugations. The amplitude is between about 0.65 times the period and about 0.75 times said period T of the corrugations.

19 Claims, 13 Drawing Sheets

(58) Field of Classification Search
CPC ...... F17C 2203/0629; F17C 2203/0663; F17C 2221/012; F17C 2221/033; F17C 2223/0123; F17C 2270/0168; F17C 2270/0184; Y02E 60/32
USPC .......................................................... 220/581
See application file for complete search history.

(56) References Cited

U.S. PATENT DOCUMENTS

| | | | | |
|---|---|---|---|---|
| 7,334,609 | B2 * | 2/2008 | Petersen | F16L 27/11 138/30 |
| 10,184,729 | B2 * | 1/2019 | Inagaki | F28D 15/0241 |
| 2004/0256016 | A1 * | 12/2004 | Arima | F16L 11/112 138/121 |
| 2004/0256017 | A1 * | 12/2004 | Arima | B32B 25/10 138/121 |
| 2005/0211326 | A1 * | 9/2005 | Hibino | F16L 11/112 138/139 |
| 2015/0048095 | A1 | 2/2015 | Sanders | |
| 2018/0283610 | A1 | 10/2018 | Wexler et al. | |
| 2019/0120432 | A1 | 4/2019 | Wexler et al. | |
| 2020/0182404 | A1 * | 6/2020 | Sawai | F17C 1/16 |

* cited by examiner

CORRUGATIONS FOR INFLATION AGAINST RIGID SHAPE

CROSS-REFERENCE TO RELATED APPLICATIONS

This application claims priority to U.S. Provisional Application No. 62/867,914, filed on Jun. 28, 2019.

BACKGROUND OF THE INVENTION

1. Field of the Invention

The present invention relates to a corrugation for use within a type IV pressure vessel for storage of compressed gas. More particularly, the invention relates to a corrugation shape for a corrugated polymer liner that is covered with a rigid outer composite shell of fiber and resin to form a tank of a type IV pressure vessel.

2. Description of Related Art

Type IV pressure vessels for storage of compressed gas comprise a non-metallic liner that is fully wrapped with fibers and a resin matrix. The resin matrix typically comprises a polyester or epoxy resin. The type IV pressure vessel generally includes a metal pressure vessel closure that includes a valve.

Type IV pressure vessels are desirable for use in vehicles since they have lower weight per unit volume in comparison to other types of pressure vessels. The type IV pressure vessels are formed from a non-metallic liner and covered with fiber and resin. Other types of pressure vessels generally have higher weight per volume than the type IV pressure vessels since other types of pressure vessels include more metal than in the type IV pressure vessel. For example, type I pressure vessels comprise a metal cylinder. Type II pressure vessels comprise a metal cylinder that is partially wrapped with fiber material. Type III pressure vessels comprise a metal liner that is fully wrapped with fiber. Thus, type IV pressure vessels are preferred for vehicle use due to the lower weight associated with using a polymer liner in place of a metal liner.

Vehicles are optionally equipped with type IV pressure vessels when the vehicle includes a hydrogen fuel cell and/or when the vehicle uses compressed natural gas as a fuel. While other types of pressure vessels, such as types I-III, can be used for vehicles, type IV is preferred due to the lower weight of the pressure vessel.

A known method of manufacturing pressure vessels having a polymer liner is disclosed in U.S. publication No. 2016/363265 wherein fiber is braided around a corrugated polymer liner and coated with resin. The polymer liner has a generally tubular shape having a corrugated portion. The corrugated portion includes a plurality of spaced apart ridges extending circumferentially around the liner with a valley between adjacent ridges. The spaced apart ridges are separated by valleys to form a traditional corrugation shape. Side walls extend between the ridges and the adjacent valley. Air space between adjacent side walls defines an annular cavity. The polymer liner is covered with braided fiber and liquid resin prior to the resin being cured to form a hard outer composite shell. The cured coated polymer liner is assembled with a metal pressure valve to form the type IV pressure vessel.

However, sometimes the liquid resin does not completely fill the annular cavities of the corrugations and results in air pockets in the annular cavities. When the pressure vessel is pressurized, pressure is evenly applied along the internal surface of the liner. When air pockets are present in the annular cavities of the corrugated liner, during an inflation process pressure applied to the liner is not evenly supported by the resin and by the rigid outer composite shell. The strain on the corrugated liner adjacent the annular cavities can result in the liner blistering outward toward the annular cavities. The distortion of the corrugated liner may result in leaks. In certain instances, the corrugated liner can rupture in the area of the air pocket, accelerating leakage of compressed gas through the liner.

It is desirable, therefore, to provide a type IV pressure vessel having a liner with corrugated sections that are resistant to leakage through the corrugated sections. It is also desirable to reduce strain on the corrugated sections caused by inflating the pressure vessel. Further, it is desirable to locate high stress zones formed during inflation in locations fully supported by the outer composite shell. Finally, it is desirable to fully support the side walls of the corrugation after inflating the pressure vessel.

SUMMARY OF THE INVENTION

A corrugation is provided in a polymeric liner configured for inflation against a rigid shape. The polymeric liner has a cylindrical wall with opposing inner and outer surfaces. The liner includes a first liner section having a plurality of annular corrugations. Each of the corrugations has a curved mountain region with a ridge, a curved valley between adjacent spaced apart mountain regions, and a side wall joining each successive mountain region and valley. A distance between successive ridges defines a period of the corrugations. The wall thickness of the liner at the ridge is greater than the wall thickness at the valley. A radial distance between the ridge and the valley defines an amplitude of the corrugations. The amplitude is between about 0.65 times and about 0.75 times the period of the corrugations.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
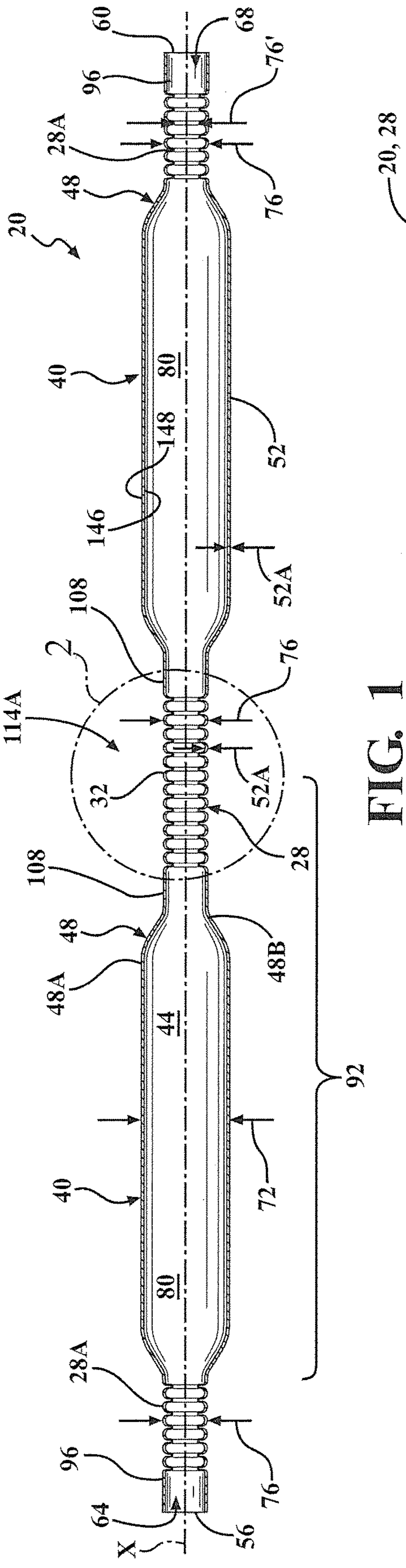
FIG. 1 is a cross-sectional view of a polymeric liner for a type IV pressure vessel, according to one embodiment of the present invention.
Figure 2:
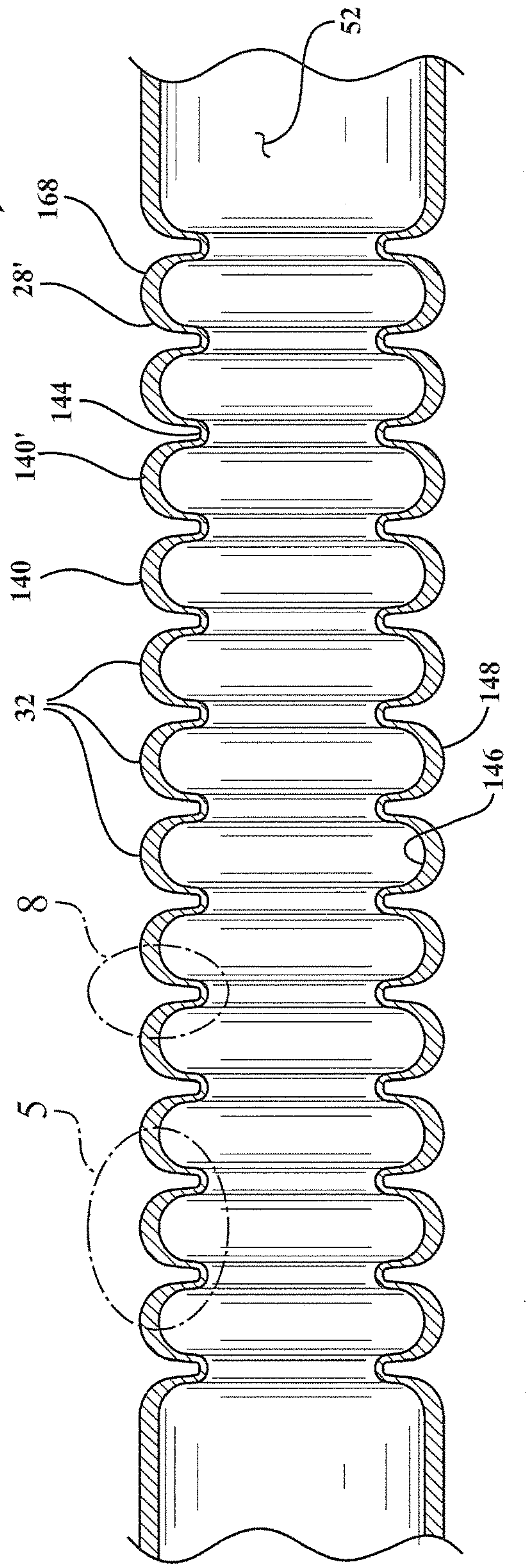
FIG. 2 is an enlarged cross-sectional view of portion 2 of the polymer liner of FIG. 1.
Figure 3:
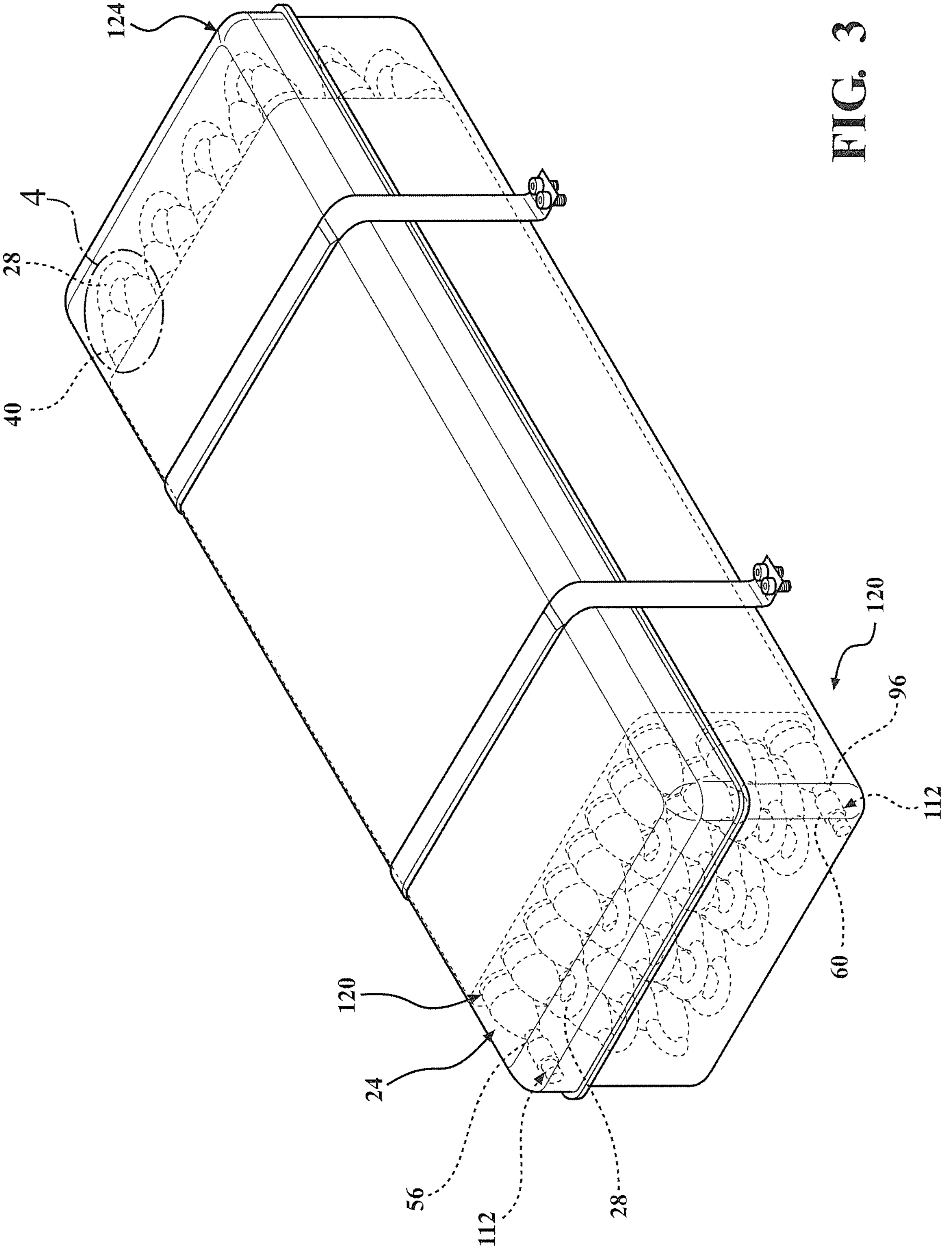
FIG. 3 is a perspective view of a conformable pressure vessel, according to one embodiment of the present invention.

Referring to the Figures, wherein like numerals indicate like or corresponding parts throughout the several views, a polymeric liner 20 is shown in FIGS. 1 and 2 that is suitable for use in a type IV elongated pressure vessel 24 such as that shown in FIG. 3. The polymeric liner 20 of FIG. 1 includes a connector section 28 with novel corrugations 32, according to one embodiment of the present invention.

Figure 4:
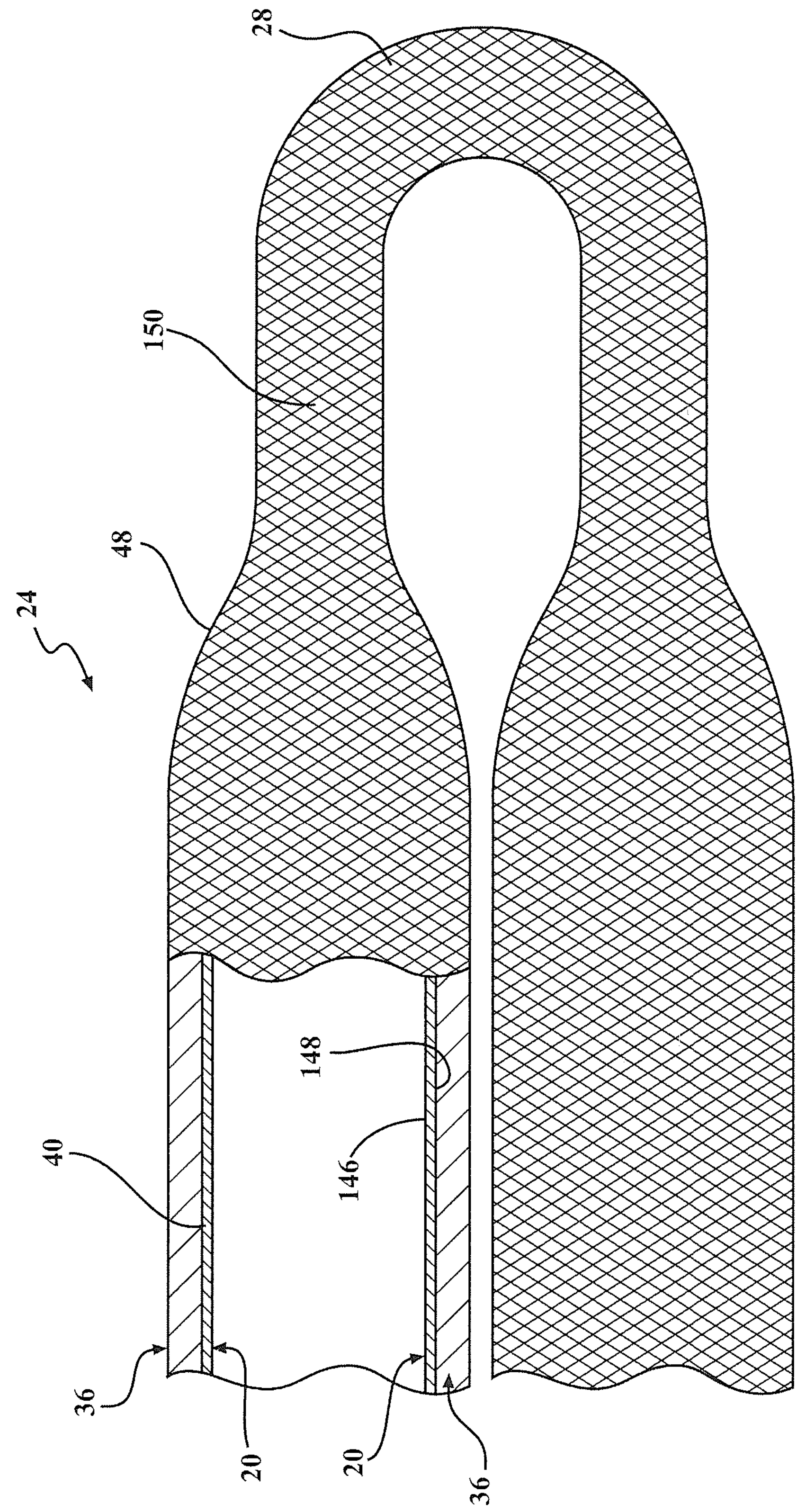
FIG. 4 is a partial cross-sectional view of portion 4 of the pressure vessel of FIG. 3.

Turning to FIG. 4, type IV pressure vessels 24 generally have a polymeric liner 20 covered with an outer composite shell 36 of resin and fiber. The pressure vessel 24 shown in FIGS. 3 and 4 is described as an elongated pressure vessel 24 and alternatively, as a conformable pressure vessel 24. The elongated pressure vessel 24 generally includes a polymeric liner 20 having a plurality of tubing sections 40 with each successive tubing section 40 coupled with connector sections 28, as shown in FIG. 1. However, alternate embodiments of elongated pressure vessels 24 can include other liner 20 configurations. For example, one embodiment of the liner 20 includes an elongated tube 40 having novel corrugations 32 extending along at least a portion of the elongated tube 40 wherein the liner 20 is covered with an outer composite shell 36 and then folded into a large spiral shape, as a non-limiting example.

FIG. 1 illustrates one embodiment of a bare liner 20 comprising a hollow body 44 having connector sections 28, taper sections 48, and tubing sections 40. The hollow body 44 is defined by an elongated cylindrical wall 52 extending between a first terminal end 56 and a second terminal end 60 of the liner 20. The polymeric liner 20 includes an inlet opening 64 at the first terminal end 56 of the liner 20, and an outlet opening 68 at the second terminal end 60 of the liner 20. Each of the inlet and outlet openings 64, 68 to the liner 20 can be used to pass fluid into and/or out of the interior 44 of the liner 20 as desired. The liner 20 can include any size, shape, length, material, and contour as desired for a specific application without altering the scope of the invention.

Also shown in FIG. 1, the liner 20 includes a plurality of elongated rigid tubing sections 40 having a first diameter 72, a plurality of connector sections 28 having a second diameter 76 that is smaller than the first diameter 72, and taper sections 48 disposed between and coupling successive elongated rigid tubing sections 40 and connector sections 28. The first diameter 72 and the second diameter 76 are measured as the outer diameter of the respective sections 40, 28. Each of the plurality of elongated rigid tubing sections 40 defines a respective chamber 80 for storage of fluid and/or gas. A repeating liner section 92 is defined as comprising a single rigid tubing section 40 in combination with taper sections 48 and connector section 28 attached to the rigid tubing section 40. Various embodiments of the liner 20 can include any desired number of repeating liner sections 92 forming any desired number of chambers 80 for storage of fluid and/or gas.

However, it should be appreciated that each repeating liner section 92 can include any combination, order, contour, length, diameter, wall thickness, and/or number of corrugated sections 28, non-corrugated sections 40, 48, and ribbed sections, as well as omitting selected sections 28, 40, 48, without altering the scope of the invention. For example, in one embodiment, a liner 20 can comprise non-corrugated sections 96 adjacent each end 56, 60 of the liner 20. In another embodiment, the liner 20 can have a uniform outer diameter from one end 56 to the opposing end 60 of the liner 20.

Non-corrugated connector sections 96, 108 can be rigid in various embodiments. In various embodiments, the connector sections 28 can have a diameter 76 that is smaller than the diameter 72 of the tubing sections 40, with the taper sections 48 providing a transition between the diameter 72, 76 of the connector sections 28 and the tubing section 40. However, further embodiments can comprise a liner 20 with sections 28, 40 having one or more suitable diameters 72, 76, and in further embodiments, a liner 20 can have sections 28, 40, 48 that are non-cylindrical, which can include various shapes. Similarly, in some embodiments, the tubing sections 40 can comprise corrugations 32.

Connector sections 28A at the first and second ends 56, 60 of the liner 20 can include cuff sections 96 configured to matingly and/or frictionally engage with boss-style fittings 112 (shown in FIG. 3).

Figure 5:
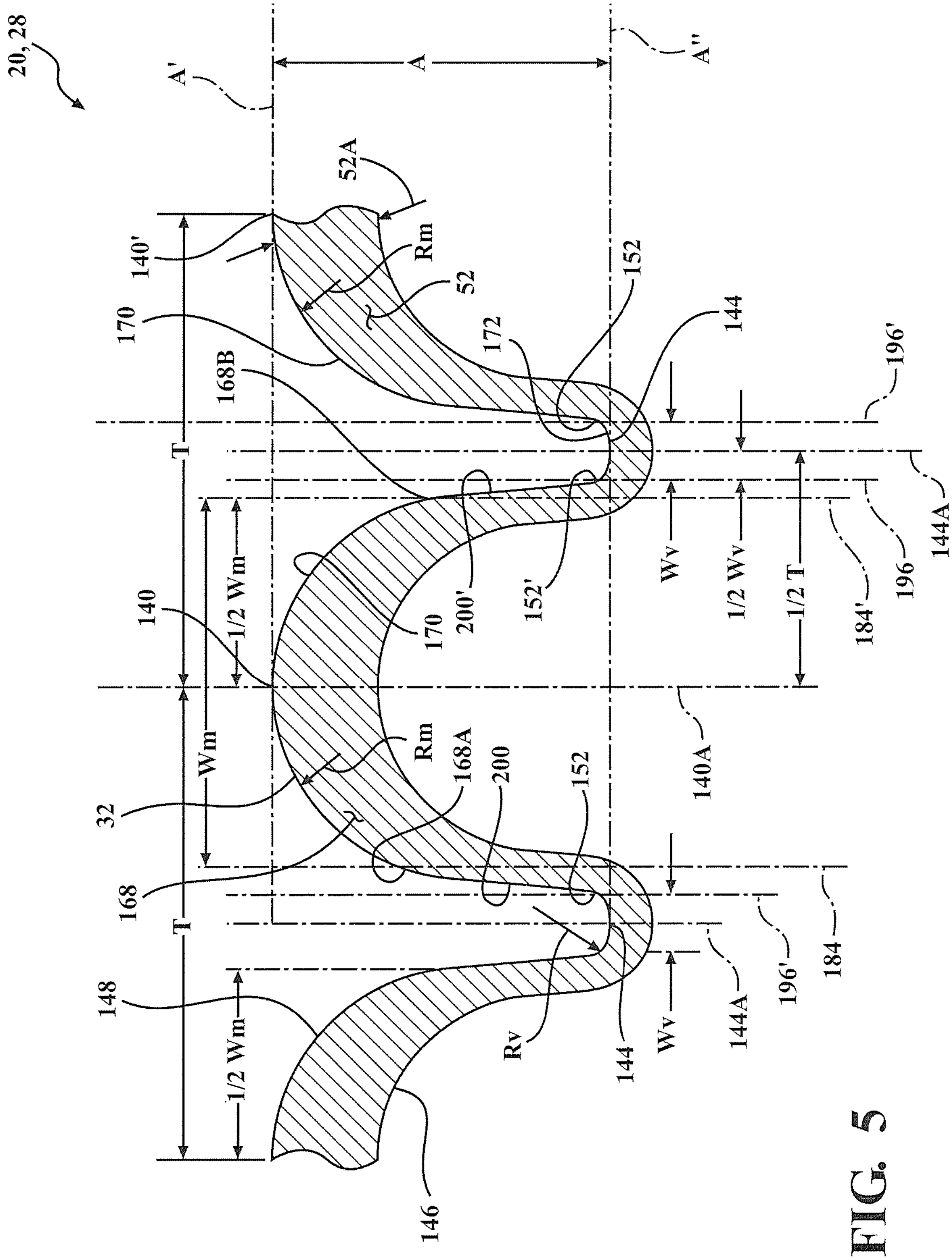
FIG. 5 is an enlarged cross-sectional view of portion 5 of the polymer liner of FIG. 2, illustrating a first embodiment of a novel corrugation.
Figure 6:
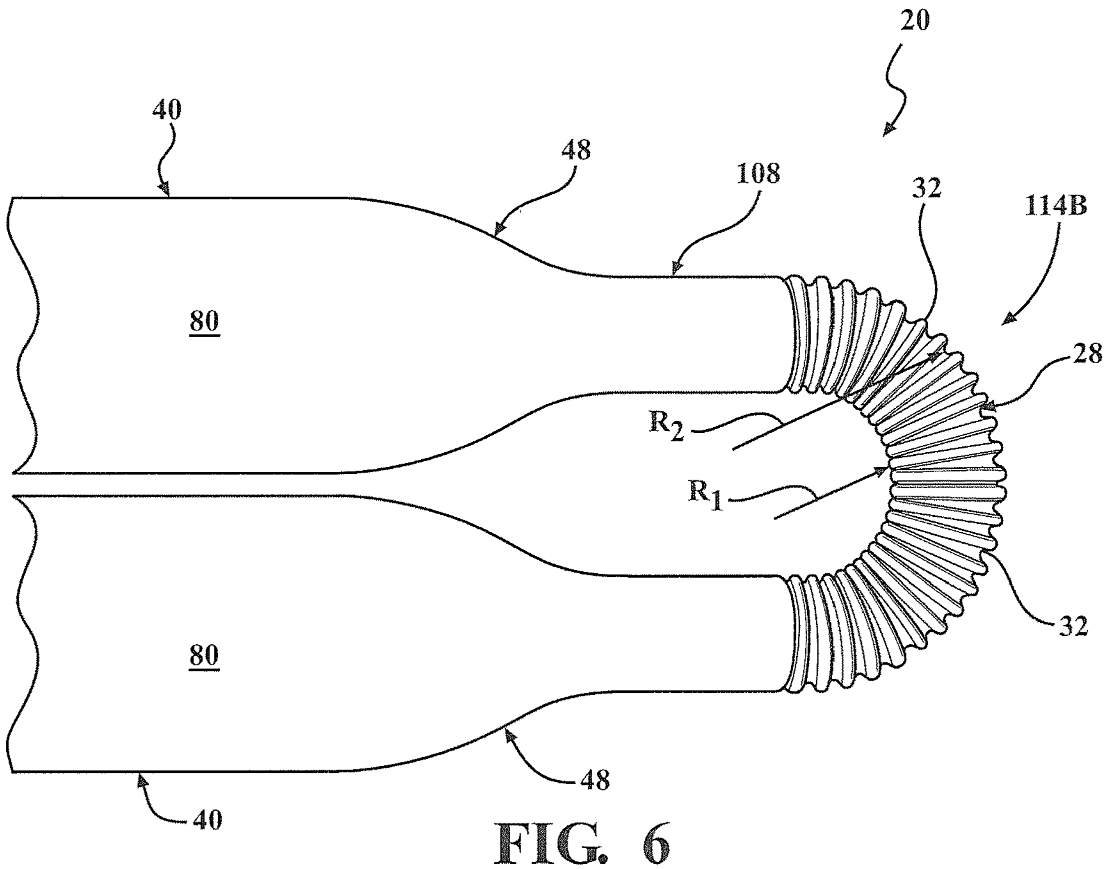
FIG. 6 is a side elevation view of the liner of FIG. 4 prior to the liner being covered with resin and fiber.

An enlarged view of the connector section 28 of FIG. 1 is shown in FIG. 2. FIG. 5 shows a cross-sectional view of the corrugations 32 of the connector section 28. The corrugations 32 are annular corrugations extending around an outer periphery 28' of the liner 20. Referring to FIGS. 2 and 5, the connector section 28 includes a plurality of adjacent corrugations 32 having a novel shape that is further described below. Each corrugation 32 extends circumferentially around the outer periphery 28' of the connector section 28. The corrugations 32 improve the flexibility of the connector section 28, allowing the liner 20 to be folded at the connector sections 28, as illustrated in FIG. 6. The novel corrugations 32 allow the connector portion 28 to be repositioned from a generally cylindrical shape 114A shown in FIG. 1 to an arcuate shape 114B shown in FIG. 6. The arcuate-shaped connector section 28 is defined by an inner bend radius $R_1$ and an outer bend radius $R_2$, as illustrated in FIG. 6. Any desired number of corrugations 32 can be included with the number being selected based on the dimensions of the liner 20 and the expected inner bend radius $R_1$ and outer bend radius $R_2$ of the folded liner 20. Typically, a required minimum number of novel corrugations 32 within the connector portion 28 is based in part on the expected inner bend radius $R_1$, the outer bend radius $R_2$, and the diameter 76 of the connector portion 28. For example, the minimum number of novel corrugations 32 required will increase as the inner bend radius $R_1$ and outer bend radius $R_2$ decrease.

Referring to FIG. 1, the liner 20 is preferably manufactured as a seamless liner 20 with no welds and using a single material. However, in some embodiments individual liner segments 92 comprising a single chamber 80 can be connected together to form an elongated liner 20 comprising a plurality of chambers 80. In some embodiments, a liner 20 can be made by forming various pieces 28, 40, 48, 96 of the liner 20 and then coupling the pieces 28, 40, 48, 96 together. For example, connector sections 28 can be manufactured separately from the taper sections 48, the tubing sections 40, and/or the cuff sections 96. Such separate sections 28, 40, 48, 96 can be subsequently coupled together to form the liner 20.

The polymeric liner 20, shown in FIG. 1, is generally formed from one or more polymeric materials such as Nylon (PA), Nylon 6 (PA6), ethylene-vinyl acetate (EVA), linear low-density polyethylene (LLDPE), low-density polyethylene (LDPE), high-density polyethylene (HDPE), polypropylene (PP), ethylene vinyl alcohol (EVOH), polytetrafluoroethylene (PTFE), polyurethane (PU), and/or polyvinyl chloride (PVC), and the like. The polymeric liner 20 may be formed of a single layer of polymeric material or may comprise a multi-layered structure of two or more polymeric layers and further may include one or more metal layers, as desired for specific applications. For example, such a liner 20 can be generated via vapor deposition, multi-layer extrusion, and/or molding, or the like. Thus, the liner 20 can comprise a single material, such as Nylon as an example, or can comprise a multi-layer material. Exemplary embodiments of a multi-layer liner 20 include an EVOH layer between a first and second nylon layer, an EVOH layer between first and second polyethylene (DPE) layers, a EVAL™ ethylene vinyl alcohol copolymer (EVOH) LA170B layer between first and second Rilsan® TIEFLEX 5442 NAT TL layers sandwiched between first and second Rilsan® polyamide 11 (PA11) BESN Black P126 TL layers, as non-limiting examples. In various embodiments a liner 20 can comprise or consist of any suitable number of layers of materials including one layer, two layers, three layers, four layers, five layers, six layers, or the like. The liner 20 is generally a polymeric liner 20 that is non-metallic; however, the polymeric liner 20 can include a metal layer within the liner 20, forming an inner surface 146, and/or forming an outer surface 148 of the liner 20.

Turning to FIG. 4, the liner 20 can be wrapped and/or over-braided with fiber strands 150 impregnated with resin, or with other suitable materials, to increase the strength of the liner 20 and thereby increase the duty pressure under which the liner 20 may safely operate. Additionally, over-braided and/or wrapped fibers strands 150 can be disposed in a plurality of layers in various embodiments. The one or more layers of fiber strands 150 impregnated with resin form a hard outer composite shell 36 after the resin is cured. Suitable fibers 150 for the outer composite shell 36 include one or more of carbon fiber, glass fiber, basalt fiber, boron fiber, aramid fiber, high-density polyethylene fiber (HDPE), Zylon™ poly(p-phenylene-2,6-benzobisoxazole fiber (PBO), aramid fiber, Kevlar® poly-paraphenylene terephthalamide fiber, polyethylene terephthalate fiber (PET), Nylon fiber (PA), polyethylene naphthalate (PEN), polyester fiber (PL), polypropylene fiber (PP), polyethylene fiber (PE), a metal, ethylene vinyl alcohol fiber (EVOH), polyurethane fiber (PU), and the like. Suitable resins include one or more of epoxy resin, vinylester resin, polyester resin, urethane, thermoplastic resin, and the like. The selection of materials and dimensions for the liner 20, as well as the type and amount of resin and fiber 150 forming the outer composite shell 36, are selected based in part on the desired operating conditions of the pressure vessel 24.

One or both ends 56, 60 of the liner 20 are fluidically connected to a boss-style fitting 112 to form a sealed pressure vessel 24, as shown in FIG. 3. Alternatively, one end 56, 60 of the liner 20 can be enclosed by other commonly known methods. The boss-style fittings 112 can be assembled with the liner 20 before and/or after the liner 20 is covered with the outer composite shell 36, as desired and suitable for the selected boss-style fittings 112.

Figure 7:
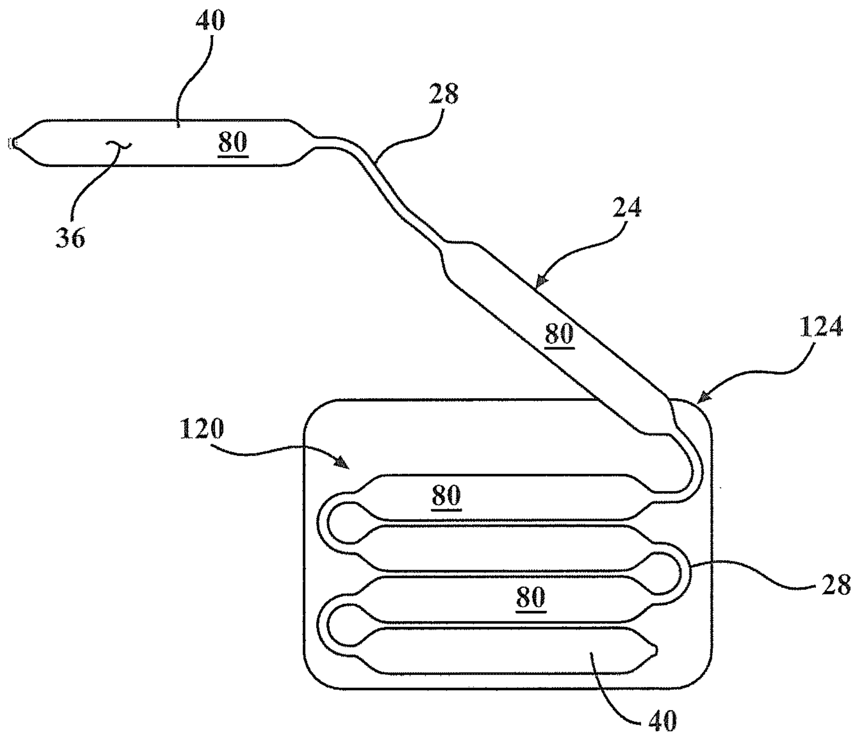
FIG. 7 is a side elevation view of the pressure vessel of FIG. 3 illustrating the pressure vessel being folded into a stacking architecture.

After the liner 20 is covered with the outer composite shell 36, the covered liner 20 is folded into a stacking architecture 120, such as illustrated in FIG. 7. The corrugations 32 of the connector sections 28 improve the flexibility of the connector sections 28, allowing the liner 20 to be folded to fill a predetermined space 124 and/or folded into a housing 124. The elongated pressure vessel 24 is formed when the liner 20 is covered with the outer composite shell 36, folded into a desired folded shape 120, and the resin cured to harden the outer composite shell 36. For example, FIG. 3 illustrates one embodiment wherein an elongated pressure vessel 24 is folded and held in a stacking architecture 120 within a housing 124.

Once fully assembled, the pressure vessel 24 is suitable for storage of liquids, compressed gases and/or compressed liquids, such as hydrogen, nitrogen, natural gas, helium, dimethyl ether, liquefied petroleum gas, xenon, and the like. A pressure vessel 24 for storage of hydrogen for automotive applications typically is designed for about 5,000 PSI to about 10,000 PSI of internal pressure during normal use. In comparison, pressure vessels 24 for storage of compressed natural gas are typically designed for about 3,000 PSI of internal pressure during normal use. Thus, the selection of liner 20 material and dimensions, as well as type and amount of resin and fiber 150 forming the outer composite shell 36, are selected based on the desired operating conditions of the pressure vessel 24.

In one exemplary embodiment of the liner 20 shown in FIG. 1, the repeating liner section 92 has an approximate overall length of about 1 meter. The large diameter tubing section 40 has an outer diameter 72 of about 46 mm and extends longitudinally for about 650 mm. Circumferential ribs and/or grooves are optionally positioned along the length of the large diameter tubing section 40. The small diameter non-corrugated sections 96, 108 and the small diameter corrugated sections 28 have an outer diameter 76 of about 21 mm. The approximate overall length of the small diameter non-corrugated sections 96, 108 and the small diameter corrugated sections 28 are about 60 mm and 140 mm, respectively. Each tapered section 48 has an outer diameter 72 of about 46 mm on a first end 48A, an outer diameter 76 of about 21 mm on an opposing end 48B, and an overall length of about 75 mm. The wall thickness 110 of the liner wall 52 is generally between about 0.3 mm and about 1.2 mm, with non-corrugated sections 40, 48, 96 having wall thickness 52A in the range of about 0.5 to about 1.2 mm and a minimum wall thickness 52B in the corrugated sections 28 of about 0.3 mm. However, it will be appreciated that the wall thickness 52A, 52B, outer diameter 72, 76, inner diameter 76', length, and number of corrugated sections 28 and non-corrugated sections 96, 108 of the liner 20 may be larger or smaller than this range as desired for an intended application without altering the scope of the invention.

Figure 8:
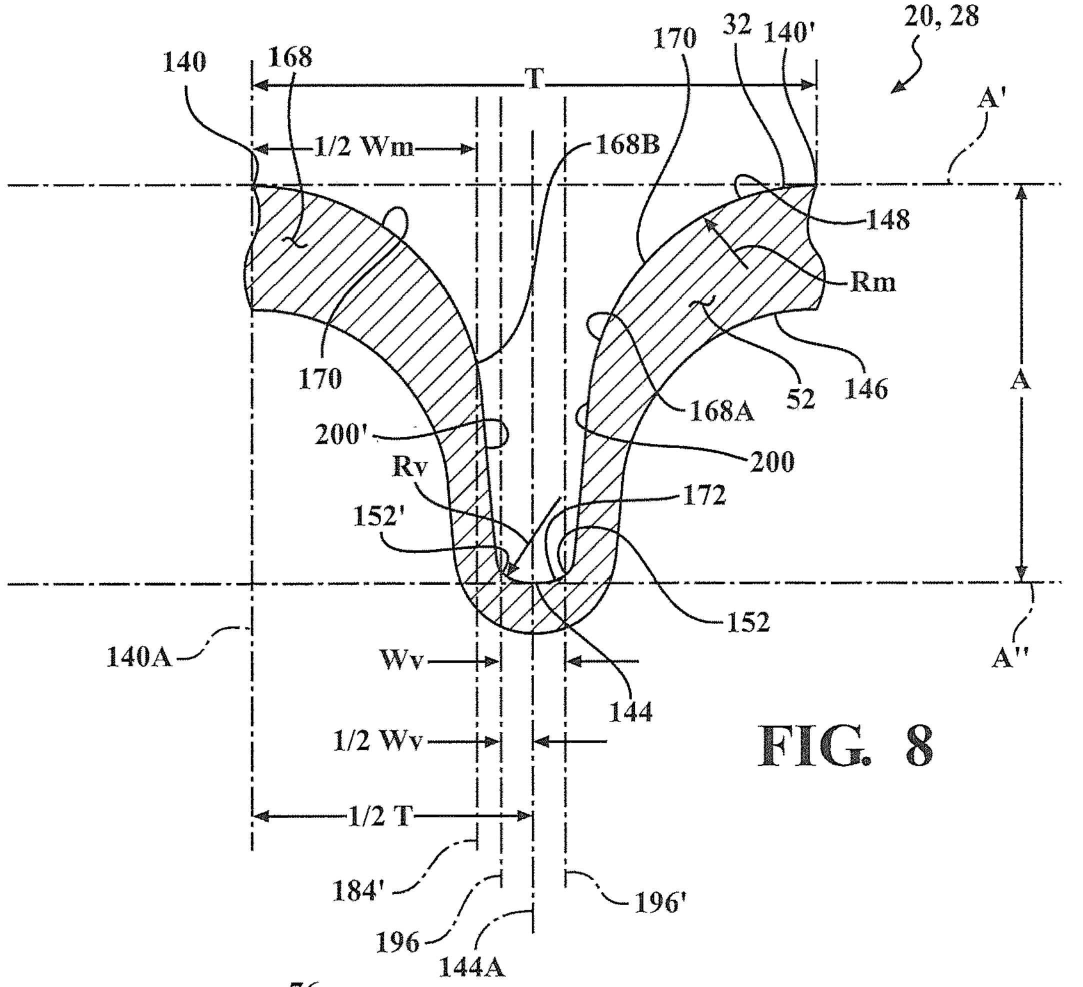
FIG. 8 is an enlarged cross-sectional view of portion 8 of the liner of FIG. 2, illustrating the first embodiment of the novel corrugation.

As illustrated in FIGS. 2 and 5, the corrugated sections 28 have novel corrugations 32 that include a plurality of spaced apart ridges 140, 140' extending circumferentially around the liner 20 with a valley 144 between adjacent ridges 140, 140'. A first embodiment of the novel corrugation 32 is shown in FIGS. 5 and 8. The novel corrugation 32 comprises an inner surface 146 and an outer surface 148. While the inner surface 146 and the outer surface 148 have similar contours, the distance 52A between the inner surface 146 and the outer surface 148 can vary as further described below. As illustrated in FIG. 1, the novel corrugation 32 has a maximum outer diameter 76 defined at a location of a ridge 140 on the outer surface 148 of the liner 20. Further, the novel corrugation 32 has a minimum inner diameter 76' defined at a location of the valley 144 on the inner surface 146 of the liner 20.

The first embodiment of the novel corrugation 32, shown in FIG. 5, is defined by a period T, an amplitude A, a valley width Wv, and a mountain width Wm. The period T of the corrugation 32 is defined as the distance between adjacent ridges 140, 140'. The amplitude A is defined as the vertical distance between the ridge 140, 140' and the valley 144 on the outer surface 148, as illustrated in FIGS. 5 and 8. Referring to FIG. 5, each ridge 140, 140' defines a peak 140, 140' of a mountain 168. Imaginary vertical reference lines 140A, 144A are shown passing through the peak 140, 140' and the center of the valley 144, respectively. The horizontal distance between the imaginary vertical reference lines 140A and 144A is half of period T illustrated as ½ T in FIG. 5.

Referring to FIG. 5, each mountain 168 has a curved profile 170 on the outer surface 148 specified by radius Rm and a width specified as Wm. The horizontal distance from the ridge 140, 140' and each end 168A, 168B of the mountain 168 is defined as ½ Wm as measured from the imaginary vertical reference line 140A. Imaginary vertical reference lines 184 and 184' spaced apart from the imaginary vertical reference line 140A define the width Wm of the mountain 168. The approximate horizontal position of the ends 168A, 168B of the mountain 168 is illustrated by the imaginary vertical reference lines 184 and 184'. The curved profile 170 of the mountain 168 is defined by radius Rm that is tangential at the center of the ridge 140, 140' to the imaginary horizontal reference line A' passing through the plurality of ridge peaks 140, 140'. The intersection of the curved profile 170 and each of the imaginary vertical reference lines 184, 184' along the outer surface 148 of the liner 20 define the end 168A, 168B of the mountain 168.

Also shown in FIG. 5, the valley 144 has a curved profile 172 on the outer surface 148 of the liner 20. The curved profile 172 of the valley 144 is defined by radius Rv that is tangential to an imaginary horizontal reference line A" spaced apart from the imaginary horizontal reference line A' by a vertical distance equal to amplitude A. Further, the radius Rv is tangential to the imaginary horizontal reference line A" at a point 144 spaced apart by an amount ½·T from the imaginary vertical reference line 140A passing through the ridge peak 140, 140'. The width of the valley 144 is defined by a horizontal distance of Wv centered around the imaginary vertical reference line 144A passing through the center of the valley 144. For reference, imaginary vertical reference lines 196, 196' are shown in FIG. 5 spaced apart from the imaginary vertical reference line 144A passing through the center of the valley 144 by an amount of ½ Wv. The intersection of the curved profile 172 and the imaginary vertical reference lines 196, 196' define ends 152, 152' of the valley 144 along the outer surface 148 of the liner 20.

Transition profiles 200, 200' between points 168A, 168B and 152, 152' are created by selecting spline profiles between end points 168A, 168B and 152, 152' that smoothly blend into the curved profiles 170, 172 of the mountain 168 and the valley 144. The transition profiles 200, 200' can extend past the end points 168A, 168B, 152, 152' in order to generate a smooth spline profile between the ridge 140 and the valley 144. The transition profiles 200, 200' are generated by a gradually changing radius of curvature along the transition profiles 200, 200'.

Exemplary dimensions of the first embodiment of the novel corrugation 32 are based in part on the outer diameter 76 of a liner connector section 28. For a liner connector section 32 having a tubing outer diameter 76 of about 21 mm and an intended bend radius $R_1$ of about 27 mm when the liner 20 is folded into a desired stacking architecture 120, a preferred period T is about 3.1 mm to about 3.3 mm, a preferred amplitude A is about 2.15 mm to about 2.35 mm, a preferred radius Rm of the mountain 168 is about 1.3 mm, and a preferred radius Rv of the valley 144 is about 0.16 mm. Further, the minimum inner diameter 76' of the inner surface 146 at the valley 144 is preferably between about 15.6 mm and about 16.2 mm. The minimum wall thickness 52A between the inner and outer surfaces 146, 148 at the valley 144 is about 0.3 mm. The remaining wall thickness 52A between the inner and outer surfaces 146, 148 is typically between about 0.5 mm and about 1.2 mm.

Figure 9:
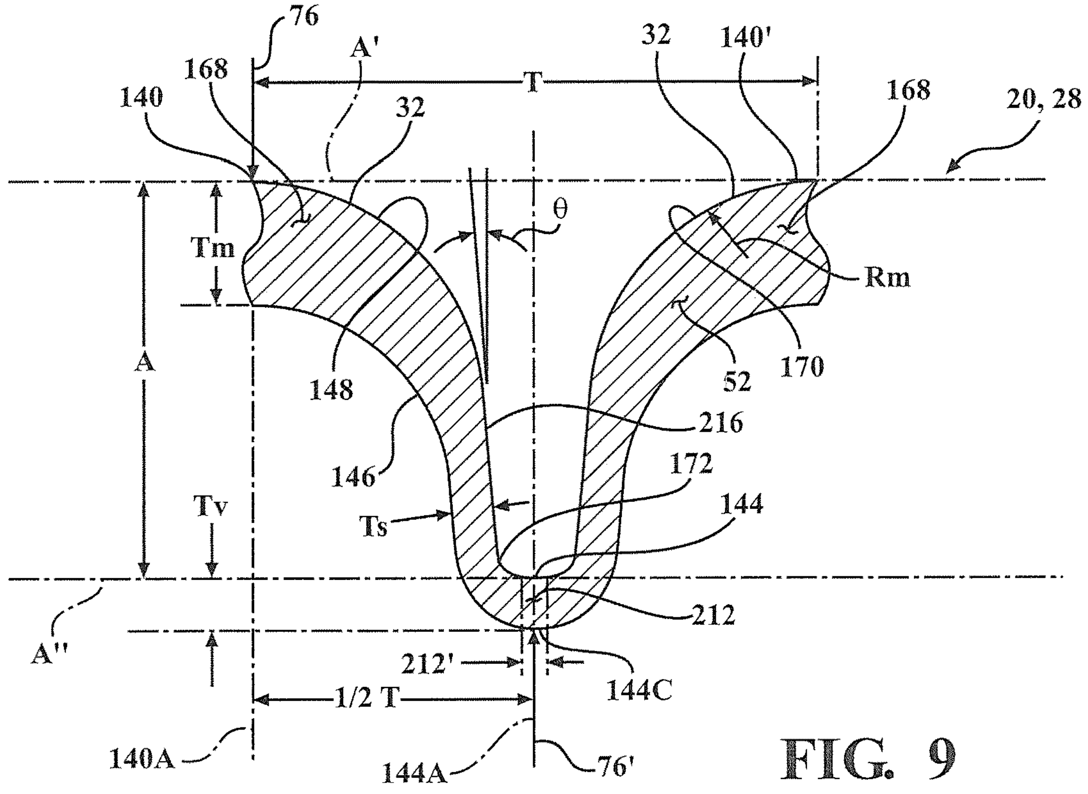
FIG. 9 is an enlarged cross-sectional view of portion 8 of the liner of FIG. 2, illustrating a second embodiment of the novel corrugation.

A second embodiment of the novel corrugation 32 is shown in FIG. 9. As in the first embodiment, the second embodiment of the novel corrugation 32 includes ridges 140, 140' of adjacent mountains 168 spaced apart by a valley 144, and opposing inner and outer surfaces 146, 148 of the liner wall 52. Further, each mountain 168 has a contoured profile 170 defining the upper surface 148 of the mountain 168. As with the first embodiment, the corrugations 32 have a maximum outer diameter 76 measured with respect to the outer surface 148 at the ridges 140, 140' and a minimum inner diameter 76' measured with respect to the inner surface 146 at the valley 144.

The novel corrugation 32 of FIG. 9 is defined by a period T, an amplitude A, a wall thickness Tm at the ridge 140 of the mountain 168, a wall thickness Tv at the valley 144, and a radius Rm of curvature of the contoured profile 170. The novel corrugation 32 of FIG. 9 also includes a flat segment 212 having a width 212' at the base 144C of the valley 144. The corrugation 32 has a sidewall section 216 that is offset from vertical by an angle θ as shown in FIG. 9. The inner and outer surfaces 146, 148 of the liner wall 52 are blended between the flat segment 212, the sidewall segments 216, and the contoured profiles 170 as desired to produce a smooth spline for each of the inner and outer surfaces 146, 148 while maintaining the liner thicknesses Tm and Tv at the ridge 140 and the valley 144, respectively.

Exemplary nominal dimensions of the second embodiment shown in FIG. 9 of the novel corrugation 32 are based in part on the outer diameter 76 of the liner connector section 28 and an intended bend radius $R_1$ (shown in FIG. 6) of the folded liner 20. The exemplary second embodiment has a nominal outer diameter 76 of the liner connector section 28 of about 21 mm and an intended bend radius $R_1$ of about 27 mm. The intended bend radius $R_1$ will increase as the outer diameter 76 increases, i.e., the bend radius $R_1$ increases with increased tubing size.

Referring to FIG. 9, a preferred period T of the second embodiment of the novel corrugation 32 is about 0.15 times the outer diameter (OD) 76 of the novel corrugation 32, e.g., $T=0.15 \cdot OD$. Preferably, the period T scales with the change in outer diameter 76. The remaining parameters also scale with the period T. The amplitude A is preferably defined as about 0.7 times the period T, e.g., $A=0.7 \cdot T$. The radius Rm of curvature of the contoured section 170 is preferably defined as about 0.41 times the period T, e.g., $Rm=0.41 \cdot T$ The angle θ of the sidewall sections 216 is preferably about 5.3 degrees.

For the second embodiment shown in FIG. 9, the width 212' of the flat segment 212 is preferably selected as about 0.038 times the period T, e.g., $flat=0.038 \cdot T$ Preferably, the width 212' of the flat segment 212 is at least 0.12 mm and the period T being at least about 3.2 mm for ease of processing during manufacturing. Further, the thickness Tm of the liner wall 52 at the ridge 140 is preferably about 0.31 times the amplitude A, e.g., $Tm=0.31 \cdot A$. Similarly, the thickness Tv of the liner wall 52 at the valley 144 is preferably about 0.13 times the amplitude A, e.g., $Tv=0.13 \cdot A$.

Exemplary preferred ranges for the parameters T, A, Rm, θ, Tm, Tv are defined below for the second embodiment of the novel corrugation 32 shown in FIG. 9. The exemplary liner section 28 has an outer diameter (OD) 76 of about 21 mm and an intended bend radius $R_1$ of about 27 mm.

The period T is calculated as $T=T_k \cdot OD$ wherein $T_k$ is a coefficient having a preferred range of about 0.135 to about 0.165 and OD is the outer diameter 76 of the liner section 28.

The amplitude A is calculated as $A=A_k \cdot T$ wherein $A_k$ is a coefficient having a preferred range of about 0.65 to about 0.75.

The radius Rm is calculated as $Rm=R_k \cdot T$ wherein $R_k$ is a coefficient having a preferred range of about 0.40 to about 0.45.

The angle θ has a preferred range of between about 5.0 degrees and about 7.0 degrees.

The width 212' of the flat segment 212 is calculated as $flat=F_k \cdot T$ wherein $F_k$ is a coefficient having a preferred range between about 0 and about 0.040.

The preferred range of the thickness Tm has a preferred minimum value calculated as $Tm \leq 0.01$. OD wherein Tm is at least 0.5 mm. The preferred maximum value of the thickness Tm is calculated as $Tm \leq 0.32 \cdot A$. Similarly, the preferred range of the thickness Tv has a preferred minimum value calculated as $Tv \leq 0.01 \cdot OD$ wherein Tv is at least 0.3 mm. The preferred maximum value of the thickness Tv is calculated as $Tv=0.27 \cdot A$. Further, preferably the selected thickness Tm is greater than the selected thickness Tv, e.g., $Tm>Tv$.

In embodiments where bend radius $R_1$ is not applicable and/or is a large value, the period T can be selected as desired. For example, if the corrugation 32 is located in a tubing section 40 of the liner 20 or near the ends 56, 60 of the liner 20, then the period T can be selected as desired since the liner 20 has minimal flex in these areas.

Figure 10:
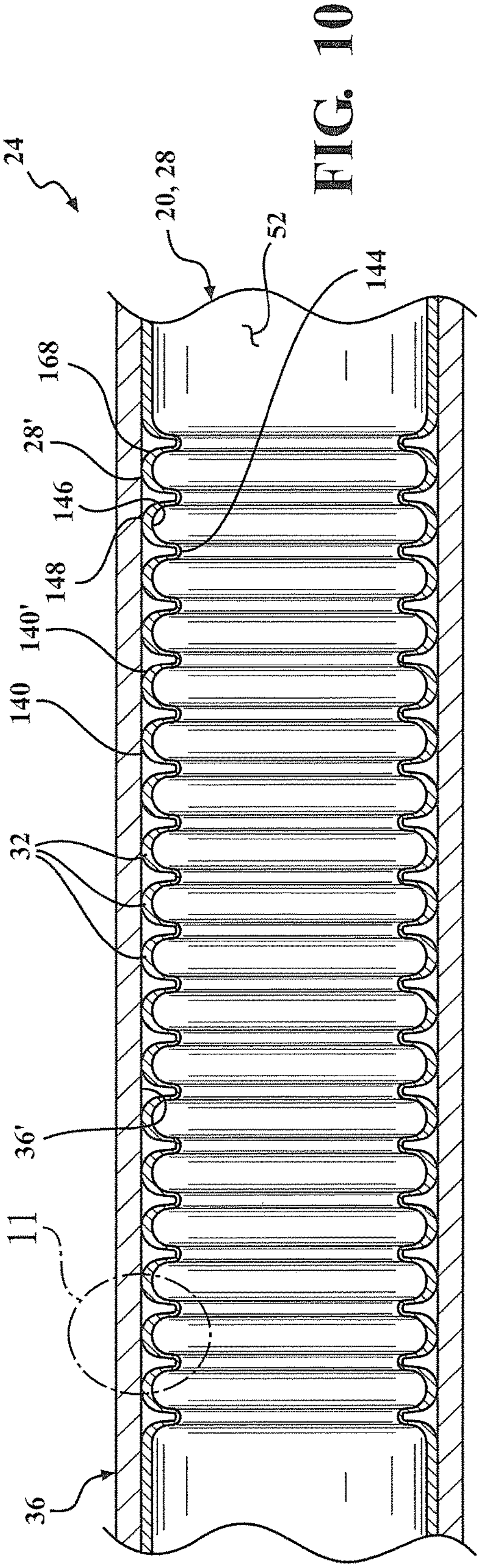
FIG. 10 is a cross-sectional view of the liner of FIG. 2 covered with an outer composite shell to Ruin a pressure vessel.
Figure 11:
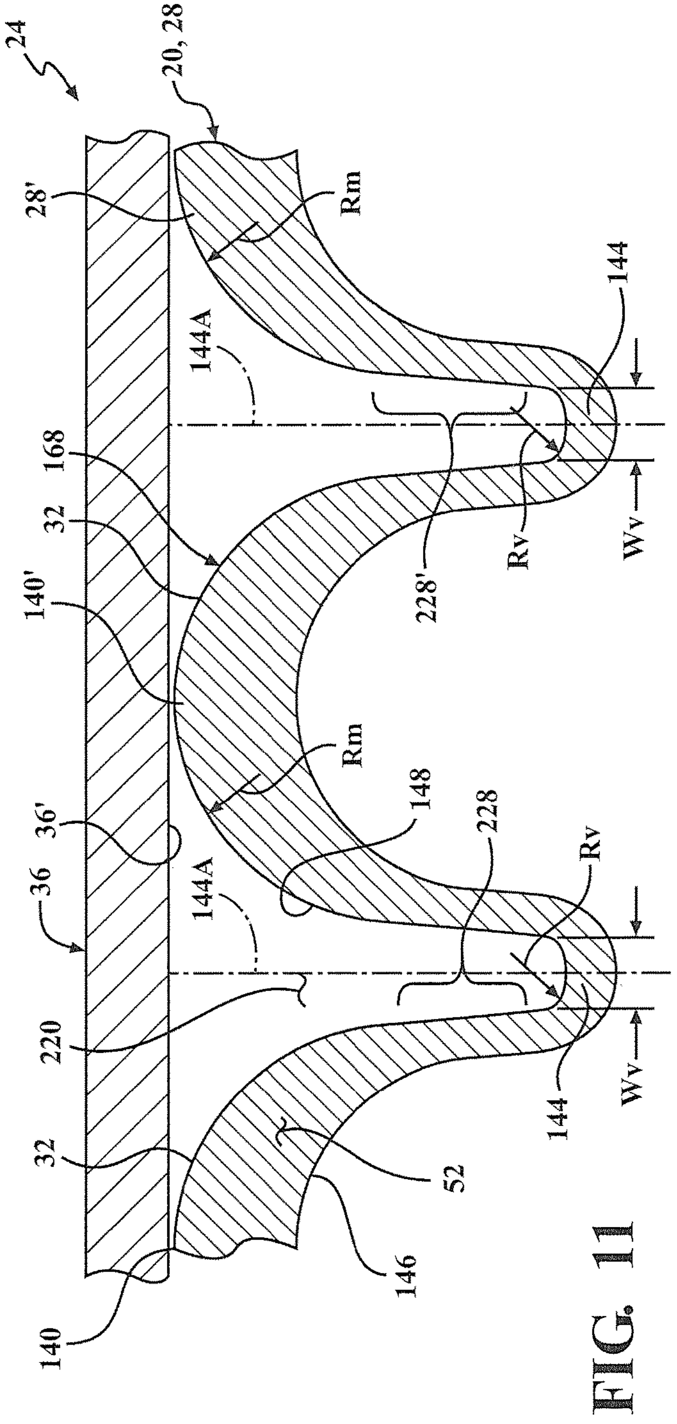
FIG. 11 is an enlarged cross-sectional view of portion 11 of the pressure vessel of FIG. 10.

FIGS. 10 and 11 show the corrugation section 28 of the liner 20 of FIG. 2 covered with the outer composite shell 36. Referring to FIG. 11, a cavity 220 can form between a lower surface 36' of the outer composite shell 36 and the liner 20 in between adjacent novel corrugations 32. The cavity 220 is bounded by the lower surface 36' of the outer composite shell 36, the upper surfaces 148 of the adjacent mountains 168, the valley 144, and sidewall portions 228, 228' extending between the mountain 168 and the valley 144.

Figure 12:
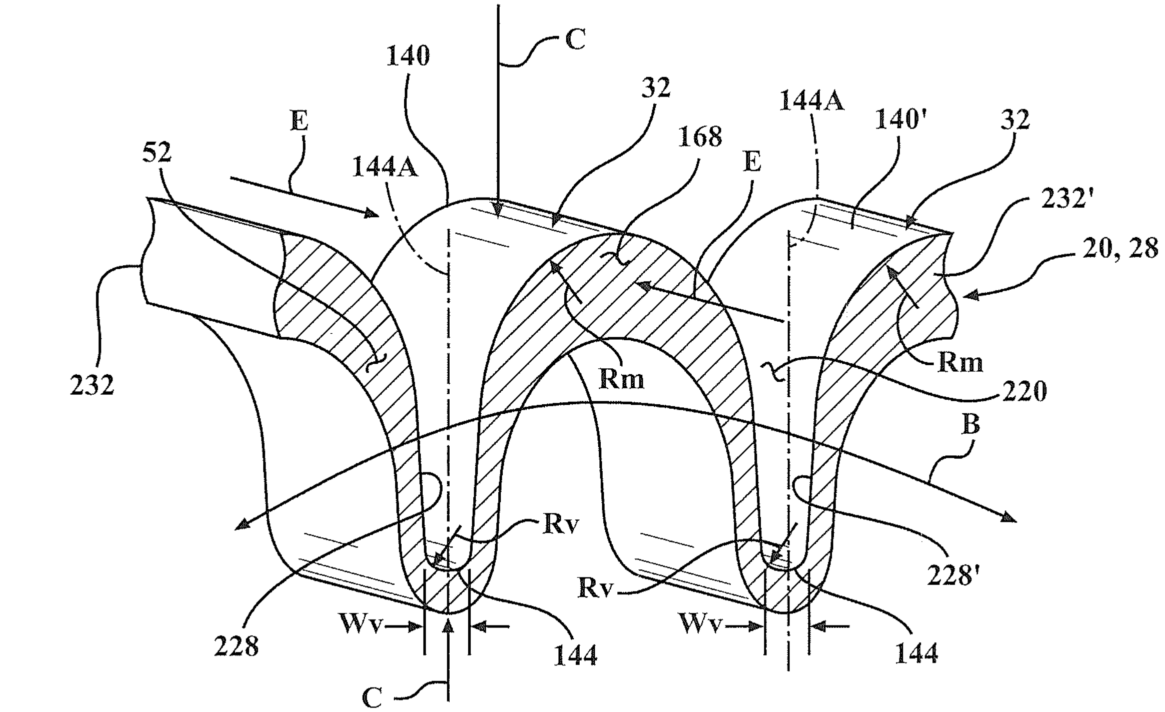
FIG. 12 is a cross-sectional perspective view of the novel corrugation of FIG. 5, illustrating compressive force, edge crush force, and bendability.

FIG. 12 illustrates compressive force C being applied to the valley 144 and the ridge 140 and edge crush force E being applied to end surfaces 232, 232' of the novel corrugation 32. Typically, the strength of corrugations 32 is evaluated based on the compressive force C, the edge crush force E, and the amount the corrugation 32 will bend as represented by arrow B.

Figure 13:
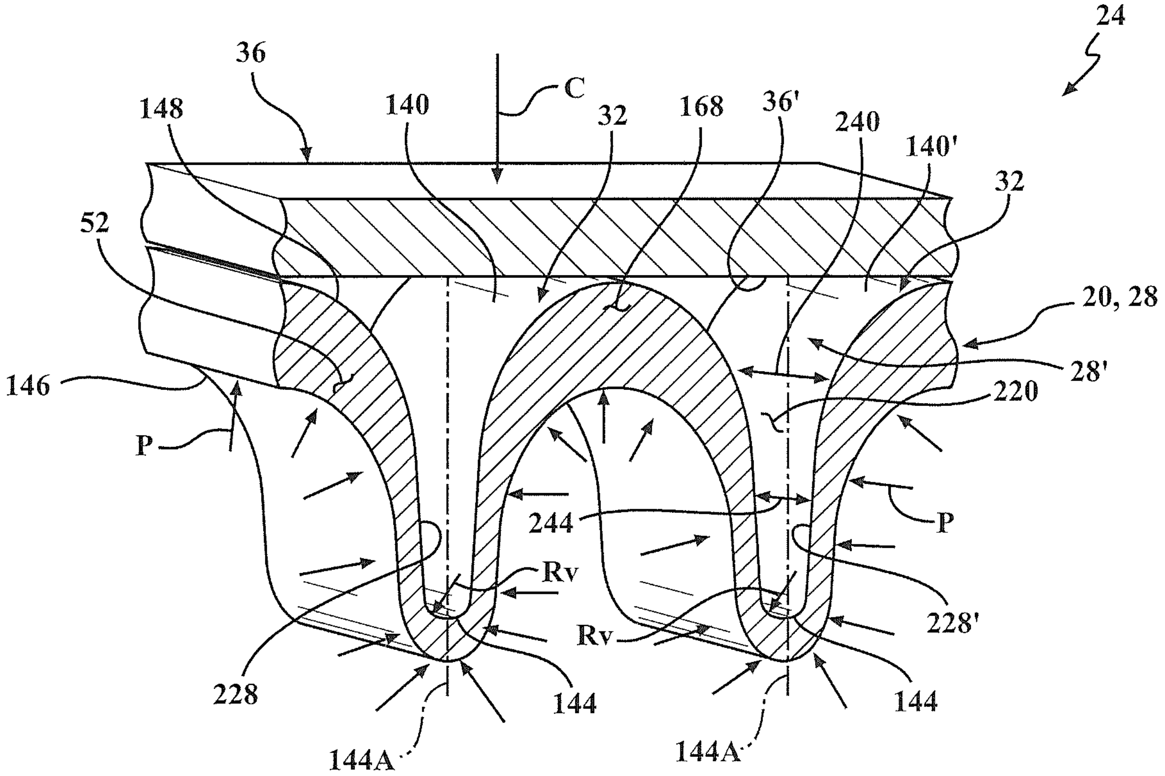
FIG. 13 is a cross-sectional perspective view of the pressure vessel of FIG. 11, illustrating compressive force on the outer composite shell and pressure applied to the liner during an inflation process.

FIG. 13 illustrates the corrugation section 28 that has been covered by the outer composite shell 36. The outer composite shell 36 is rigid after the resin is cured. The outer composite shell 36 absorbs compressive forces C applied to the pressure vessel 24. Thus, the corrugations 32 are not affected by compressive forces C applied to the pressure vessel 24. The edge crush force E is not applicable since the liner 28 is cylindrical and the outer composite shell 36 surrounds the outer periphery 28' of the liner 28. After the outer composite shell 36 is applied, the covered liner 20 folded into the stacking architecture 120, and the resin is cured to harden the outer composite shell 36, the amount the corrugation 32 will bend (arrow B of FIG. 12) is no longer applicable because the outer composite shell 36 retains the liner 20 in a fixed position.

However, when the pressure vessel 24 is pressurized, pressure P is applied uniformly along the inner surface 146 of the liner 20, as shown in FIG. 13. During pressurization, the liner 20 is inflated against the outer composite shell 36. The cavities 220 formed between adjacent novel corrugations 32 are not fully supported by the outer composite shell 36. While resin can intrude into the cavities 220 during processing, the outer wall 148 is often not evenly supported by the outer composite shell 36 due to air bubbles trapped in the cavities 220. Of particular concern is a gap 240 in the cavity 220 near the transition between the mountain 168 and the side walls 228, 228' and a gap 244 between opposing side walls 228, 228'. The novel corrugation 32 is specifically configured to minimize the probability of developing blisters, cracks, and pin hole leaks in the outer surface 148 in these gaps 240, 244.

Figure 14:
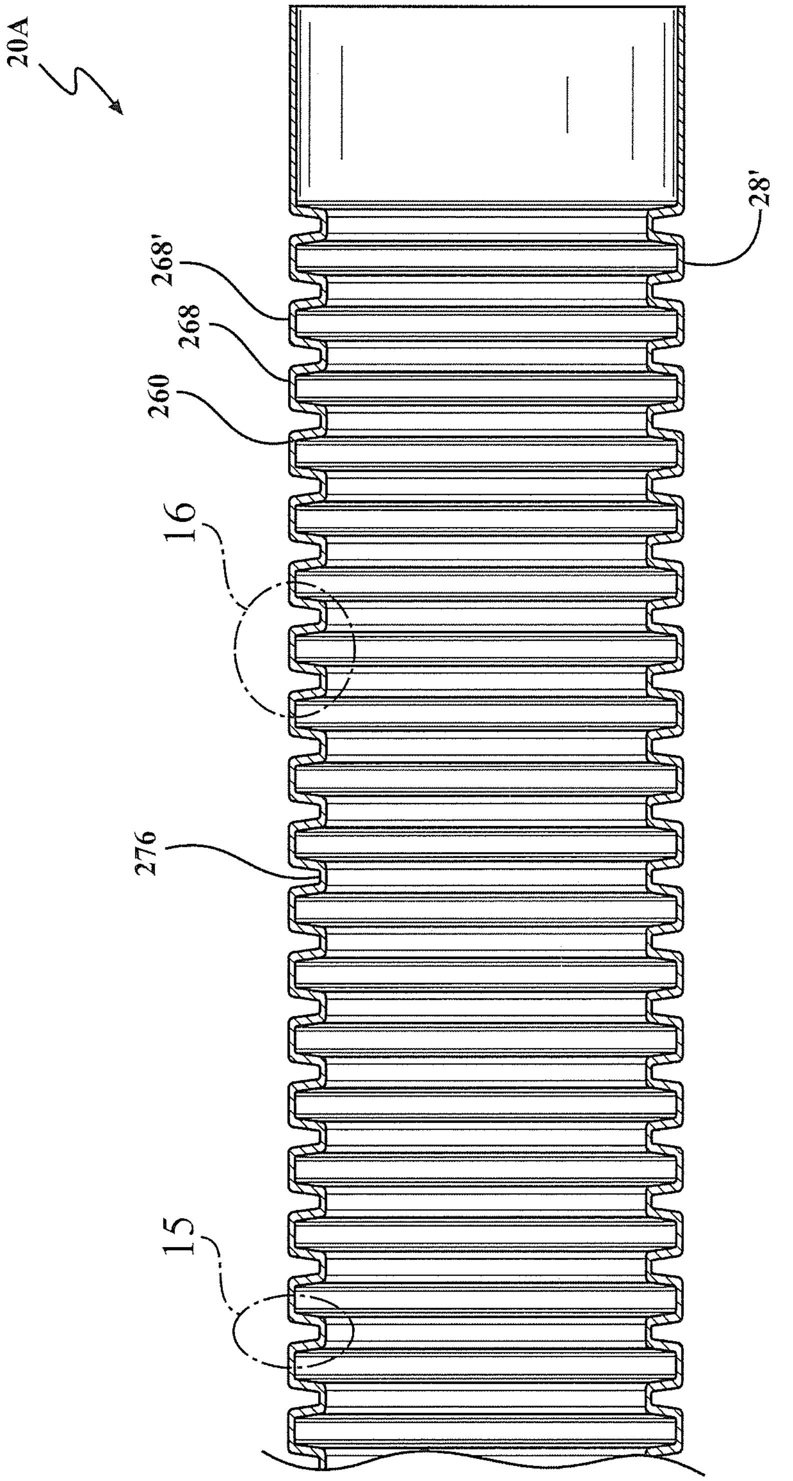
FIG. 14 PRIOR ART
FIG. 14 is a cross-sectional view of a known corrugated liner having traditional corrugations.

The advantages of the novel corrugation 32 are best shown by examining a traditional corrugation shape 260 when used as part of a liner 20A for a pressure vessel 24A, as illustrated in FIGS. 14-18. Referring to FIG. 14, the exemplary tubular liner 20A includes known traditional corrugations 260 comprising spaced apart ridges 268, 268'. A valley 276 is defined between adjacent ridges 268, 268'. Traditional corrugations 260 are intended for added stiffness while being bendable.

Figure 15:
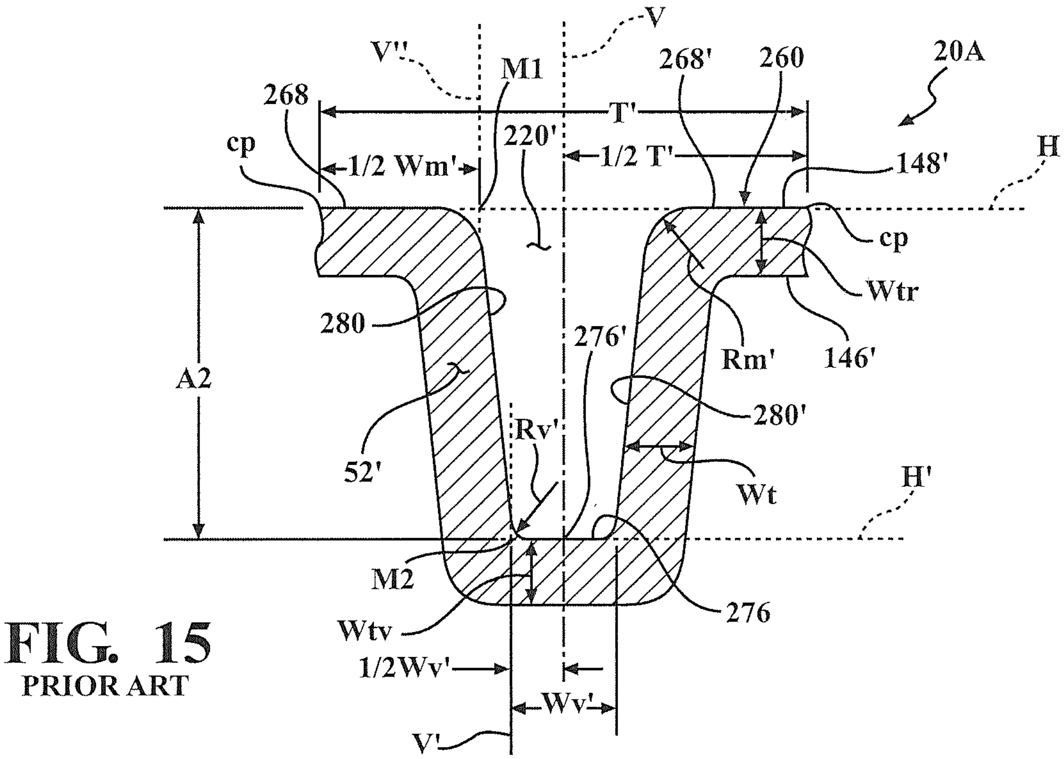
FIG. 15 PRIOR ART
FIG. 15 is a cross-sectional view of portion 15 of the known corrugated liner of FIG. 14.
Figure 16:
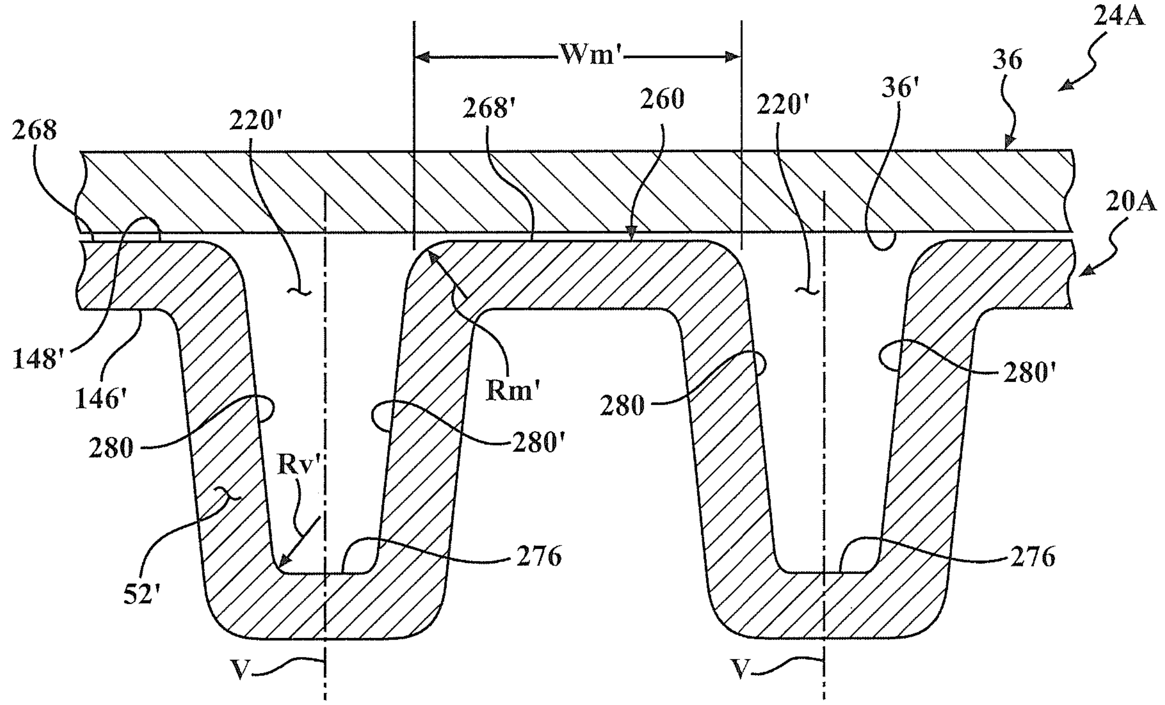
FIG. 16 PRIOR ART
FIG. 16 is an enlarged cross-sectional view of portion 16 of the known corrugated liner of FIG. 14 covered with an outer composite shell to form a known pressure vessel.

An enlarged view of the traditional corrugation 260 is shown in FIG. 15. FIG. 16 illustrates an enlarged cross-sectional view of a portion of the liner 20A covered with an outer composite shell 36. Referring to FIG. 15, the traditional corrugation 260 is formed by an outer wall 52' of the liner 20A having an inner surface 146' and an outer surface 148'. The geometry of the traditional corrugation 260 is defined by amplitude A2, a period T', a valley 276 width Wv', and a mountain width Wm', as illustrated in FIG. 15. Both the ridge 268, 268' and the valley 276 have generally horizontal upper and lower surfaces 146', 148' as further illustrated by an imaginary horizontal reference lines H, H' extending across the ridges 268, 268' and the valley 276, respectively. Similarly to the novel corrugations 32, the vertical spacing between the ridges 268, 268' and the valley 276 of the traditional corrugation 260 is defined by amplitude A2 as illustrated in FIG. 15. The imaginary horizontal reference line H' is spaced apart from the imaginary horizontal reference line H by an amount of the amplitude A2.

In contrast, the novel corrugation 32 has a curved upper profile 170 of radius Rm for the mountains 168 and a curved lower profile 170 of radius Rv in the valleys 144, as shown in FIG. 5. While the second embodiment of the novel corrugation 32 shown in FIG. 9 includes a flat segment 212 in the valley 144, the flat segment 212 is defined as having a width between 0.0 mm and a maximum width of about 0.040 times the period T of the corrugation 32.

Returning to FIG. 15, the traditional corrugation 260 is generally defined by period T' between center points cp of adjacent ridges 268, 268'. The width of the ridges 268, 268' are defined as Wm' as shown in FIG. 16. Each ridge 268, 268' has a flat portion having a width of ½ Wm' on either side of the center point cp, as shown in FIG. 15. Approximate end points M1 of each ridge 268, 268' are generally defined by the intersection point M1 of the imaginary horizontal reference line H and an imaginary vertical reference line V" spaced apart from the center point cp by an amount of ½ Wm'. The outer profile 148' of the traditional corrugation 260 includes a radius Rm' blending the corner M1 between the ridge 268, 268' and adjacent side walls 280, 280'. In contrast, the novel corrugation 32 shown in FIG. 8 has a curved profile 170 extending on either side of the ridge peak 140, 140' having a width of ½ Wm. The curved profile 170 of the novel corrugation 32 reduces the development of leaks in comparison to the flat ridges 268, 268' of the traditional corrugation 260 of FIG. 15.

Each valley 276 of the traditional corrugation 260 includes a generally flat valley 276 having a width defined by Wv', as illustrated in FIG. 15. A center point 276' of the valley 276 is defined by an intersection point 276' of the imaginary horizontal reference line H' and an imaginary vertical reference line V spaced apart from the center point cp of the adjacent ridges 268, 268' by half of the period T', illustrated as ½ T'. The approximate ends M2 of the valley 276 are defined by an intersection point M2 of the imaginary horizontal reference line H' and an imaginary vertical reference line V' spaced apart from the imaginary vertical reference line V by an amount of ½ Wv', as illustrated in FIG. 15. The outer profile 148' of the traditional corrugation 160 includes a radius Rv' blending the corner M2 between the valley 276' and adjacent side walls 280, 280'.

While some embodiments of the novel corrugation 32 can include flat segments 212 as shown in FIG. 9, the width of the flat segments 212 is restricted to a maximum width of about 0.040 times the period T of the novel corrugation 32. In contrast, as illustrated in FIG. 15, the entire width Wv' of the valley 276 of the traditional corrugation 260 is flat with the exception of a radius Rv' blending the valley 276 to adjacent side walls 280, 280' of the traditional corrugation 260.

Also shown in FIG. 15, side walls 280, 280' connect the ridges 268, 268' and the valley 276 of the traditional corrugation 260. The side walls 280, 280' are generally straight walls 280, 280' with end points of M1 and M2. The radius Rm' is defined between the ridge 268, 268' and the adjacent side wall 280, 280' to transition between the ridge 268, 268' and the side wall 280, 280'. Likewise, the radius Rv' is defined between the side wall 280, 280' and the valley 276 to transition between the valley 276 and the adjacent side wall 280, 280'. In addition, a cavity 220' is defined in the space between the adjacent side walls 280, 280' and the valley 276. The cavity 220' of the traditional corrugation 260 is similar to the cavity 220 formed in the novel corrugation 32, i.e., the cavities 220, 220' are bounded by the upper surface 148, 148' of the liner 20, 20A forming the side walls 228, 228', 280, 280' of each valley 144, 276 and the lower surface 36' of the outer composite shell 36. As with the cavity 220 of the novel corrugation 32 of FIG. 11, the cavity 220' of the traditional corrugation 260 of FIG. 16 can be filled by resin during the manufacturing process of the pressure vessel 24A. As with the novel corrugation 32, irregular air pockets can form within the cavity 220' of the traditional corrugation 260 if the resin does not completely fill the cavity 220'

As illustrated in FIG. 15, the outer surface 148' profile of the traditional corrugation 260 is generally uniformly offset from the inner surface 146' profile by a wall thickness Wt. For example, the wall thickness Wtr of the ridge 268, 268' is approximately the same wall thickness Wtv of the valley 276. Further, the wall thickness Wt of the side walls 280, 280' is approximately the same wall thickness Wtr, Wtv of the ridges 268, 268' and of the valley 276.

In contrast, the novel corrugation 32 illustrated in FIG. 9 has a wall thickness Tm at the ridge 140 that is thicker than the wall thickness Tv at the valley 144. Specifically, the wall thickness Tm is preferably selected as at least a maximum value of (0.01·OD or 0.5 mm) and less than or equal to 0.32·A. Likewise, the wall thickness Tv of the valley 144 is preferably selected as at least a maximum value of (0.01·OD or 0.3 mm) and less than or equal to 0.27·A. Further, the novel corrugation 32 specifically requires the wall thickness Tm being equal or greater than the wall thickness Tv. Preferably, the novel corrugation 32 has the wall thickness Tm as being greater than the wall thickness Tv. However, for smaller outer diameter tubes used in some embodiments, the wall thickness Tm can be selected as about equal to the wall thickness Tv for pressure vessels 20 with low operating pressures, as a non-limiting example.

Referring to FIG. 9, for certain embodiments of the novel corrugation 32 having an outer diameter of about 21 mm, Tm can be preferably selected as between about 0.5 mm and about 1.2 mm and the Tv can be preferably selected as at least 0.3 mm with Tm being selected as a larger value than the selected value of Tv. The wall thickness Tm is preferably selected as a larger value than the wall thickness Tv as further explained with respect to FIG. 20 described below.

Figure 17:
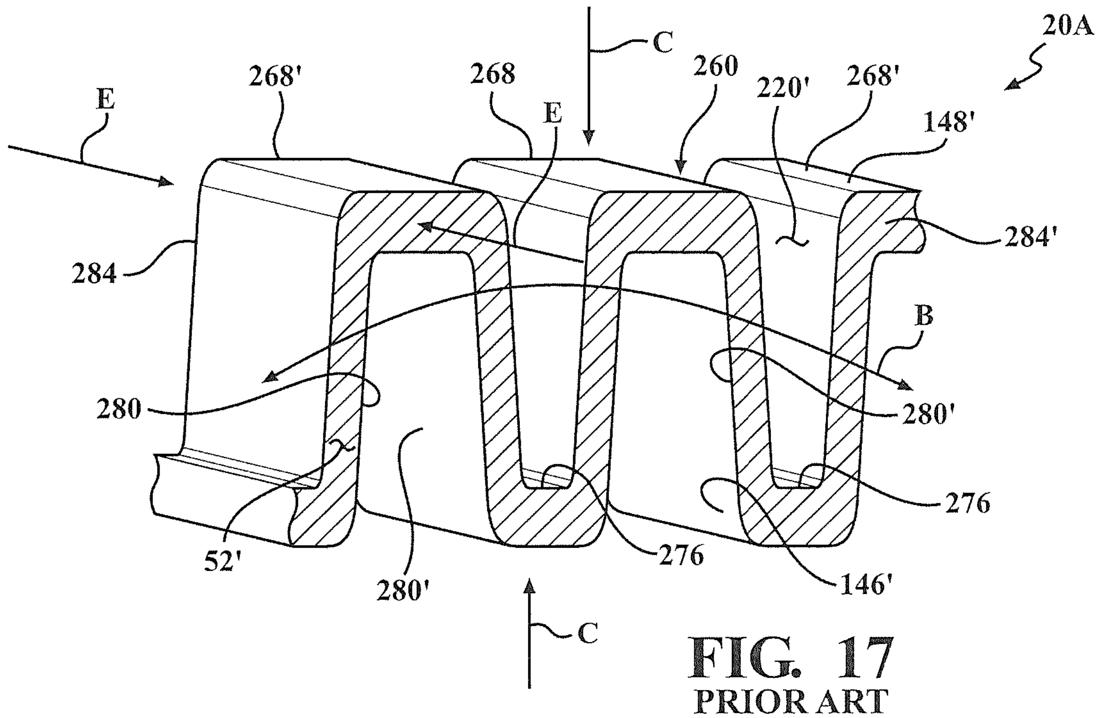
FIG. 17 PRIOR ART
FIG. 17 is an enlarged perspective cross-sectional view of the known corrugated liner of FIG. 14, illustrating compressive force, edge crush force, and bendability.

FIG. 17 illustrates compressive force C being applied to the valley 276 and the ridge 268 and edge crush force E being applied to end surfaces 284, 284' of the traditional corrugation 260. Generally, the strength of traditional corrugations 260 is evaluated based on the compressive force C, the edge crush force E, and the amount the traditional corrugation 260 will bend as represented by arrow B. The traditional corrugation 260 is generally designed to withstand predetermined compressive force C and edge crush force E while allowing the traditional corrugation 260 to be flexible. The relative amount of compressive force C supportable by the traditional corrugation 260 is greater than the relative amount of compressive force C supportable by the novel corrugation 32. Likewise, the relative amount of edge crush force E supportable by the traditional corrugation 260 is greater than the relative amount of edge crush force E supportable by the novel corrugation 32. The uniform wall thickness Wt, straight side walls 280, 280', flat ridges 268, and flat valleys 276 of the traditional corrugation 260 increase the amount of compressive force C and edge crush force E supportable by the traditional corrugation 260 in comparison to the novel corrugation 32.

Figure 18:
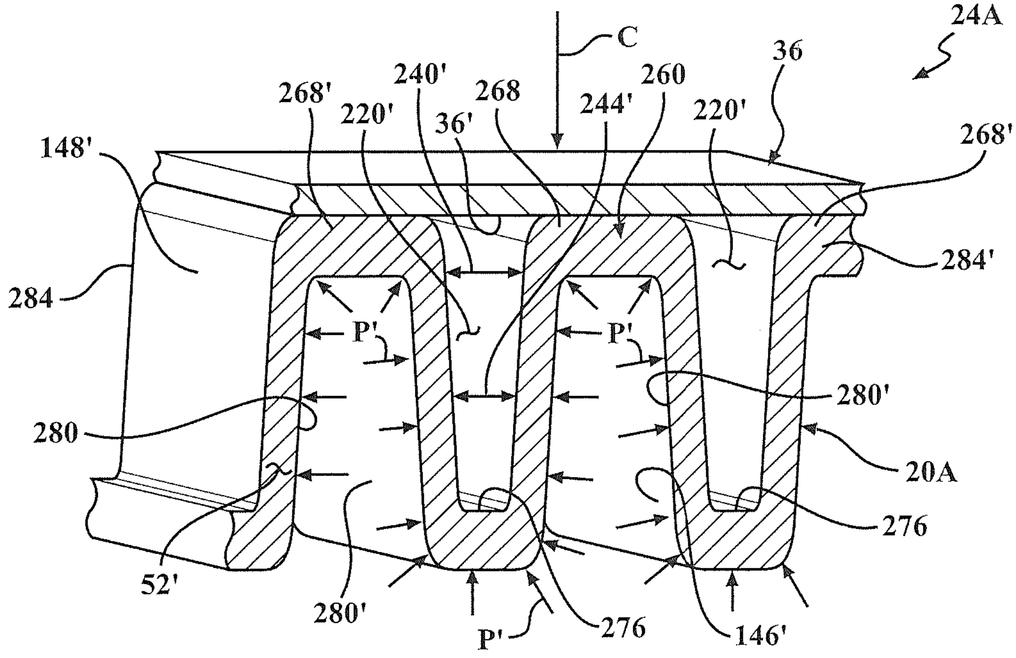
FIG. 18 PRIOR ART
FIG. 18 is an enlarged perspective cross-sectional view of the known pressure vessel of FIG. 16, illustrating compressive force on the outer composite shell and pressure applied to the known corrugated liner during an inflation process.

FIG. 18 illustrates the corrugation section 20A of FIG. 14 covered by an outer composite shell 36. The outer composite shell 36 is rigid after the resin is cured. Thus, the outer composite shell 36 absorbs compressive forces C applied to the pressure vessel 24A. Therefore, the traditional corrugations 260 are not affected by compressive forces C applied to the pressure vessel 24A. The edge crush force E is not applicable since the liner 20A is cylindrical and the outer composite shell 36 surrounds an outer periphery 28' of the liner 20A. After the outer composite shell 36 is applied, the covered liner 20A folded into the stacking architecture 120, and the resin is cured to harden the outer composite shell 36, the amount the traditional corrugation 260 will bend (arrow B of FIG. 17) is no longer applicable because the outer composite shell 36 retains the liner 20A in a fixed position. Therefore the inherent capabilities of the traditional corrugation 260 to support higher levels of compressive force C and edge crush force E over the novel corrugation 32 does not provide an advantage when integrated within a pressure vessel 20, 20A as further illustrated in FIGS. 19 and 20.

When the traditional corrugations 260 are included as part of a pressure vessel 24A and the pressure vessel 24A is pressurized, pressure P' is applied uniformly along the inner surface 146' of the liner 20A, as shown in FIG. 18. During pressurization, the liner 20A is inflated against the outer composite shell 36. The cavities 220' formed between adjacent traditional corrugations 260 are not fully supported by the outer composite shell 36. While resin can intrude into the cavities 220' during processing, the outer wall 148' is often not evenly supported by the outer composite shell 36 due to air bubbles trapped in the cavities 220'. Of particular concern is a gap 240' in the cavity 220' near the transition between the mountain 268, 268' and the side walls 280, 280' and a gap 244' between opposing side walls 280, 280'.

Figure 19:
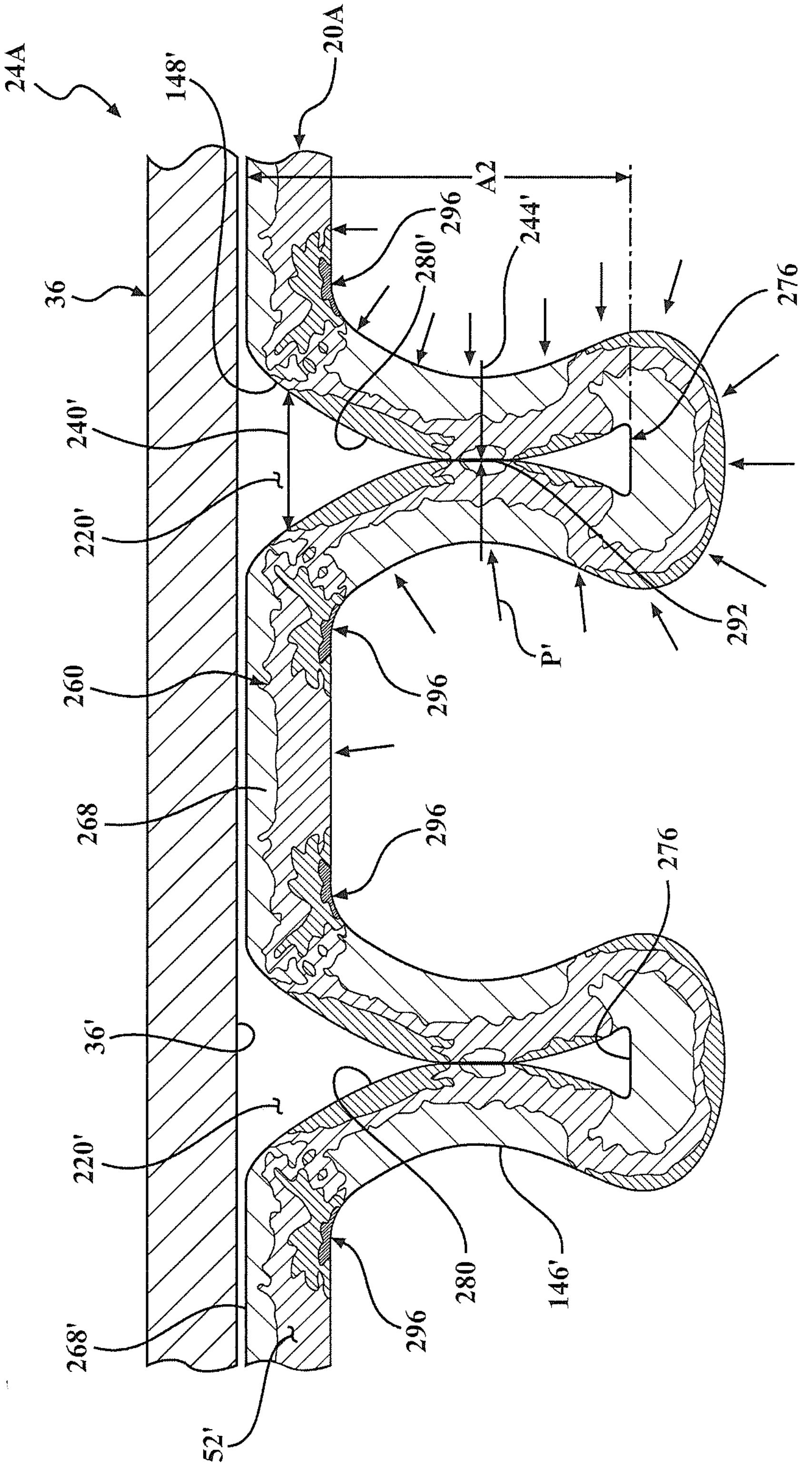
FIG. 19 PRIOR ART
FIG. 19 is an enlarged cross-sectional view of the known pressure vessel of FIG. 16 after an inflation process, illustrating maximum stress concentration shortly after self-contact is made.

FIG. 19 shows a cross-sectional view of the traditional corrugations 260 of the pressure vessel 24A after the liner 20A is covered with the outer composite shell 36, the resin cured to harden the outer composite shell 36, and after inflation. In specific, FIG. 19 shows the traditional corrugations 260 after inflation to the point of maximum stress concentration. The point of maximum stress concentration occurs shortly after self-contact between adjacent side walls 280, 280' occurs. Self-contact is defined as the traditional corrugation 260 being expanded during the inflation process until the liner 20A firmly contacts the outer composite shell 36 and the adjacent side walls 280, 280' collapse towards each other until the adjacent side walls 280, 280' abut the opposing side wall 280', 280. The process of self-contact is further described as a reaction under pressure.

Referring to FIG. 19, pressure P' is evenly applied along the inner surface 146' of the traditional corrugations 260 during inflation. Since the side walls 280, 280' of the valley 276 are not fully supported by the outer composite shell 36, when the pressure P' is elevated above the resistive strength of the corrugation 268, the side walls 280, 280' will collapse towards each other until the side walls 280, 280' make contact with the opposing side wall 280', 280. The side walls 280, 280' collapse into the gap 244' of the cavity 220' during the inflation process. The side walls 280, 280' have a contact point 292 midway up the side wall 280, 280' as shown in FIG. 19 wherein the gap 244' in the cavity 220' is completely collapsed. Once the side walls 280, 280' abut the adjacent side wall 280', 280 at contact point 292, both side walls 280, 280' are evenly supported by the opposing side wall 280', 280. Thus, it is desirable to collapse the side walls 280, 280' until the side walls 280, 280' are in contact with the opposing side wall 280', 280 since the side walls 280, 280' are evenly supported after the collapse. Further, it is desirable that the side walls 280, 280' initiate collapse towards the adjacent side wall 280', 280 at a low value of pressure P' since the amount of strain on the liner wall 52' is related to the pressure level P' applied.

High stress zones 296 are created during pressurization near the transition M1 between the ridges 268, 268' and the side walls 280, 280' of the traditional corrugations 260 on the inner surface 146', as shown in FIG. 19. These high stress zones 296 form near the gap 240' in the cavity 220'. The liner wall 52' forming the side walls 280, 280' and the ridges 268, 268' is not fully supported by the outer composite shell 36 in the high stress zones 296 since cavities 220' are formed between the outer composite shell 36 and the valley 276 of the traditional corrugation 260. These high stress zones 296 have an increased potential to cause blistering, cracking, and creating pinhole leaks in the liner wall 52'. Further, these high stress zones 296 form on the inner surface 146' of the liner 20A. The inner surface 146' of the liner 20A is in contact with the fluid pressurizing the pressure vessel 24A. Constant exposure to the pressurized fluid within the pressure vessel 24A can increase the probability that the high stress zones 296 will fail.

Preferably, high stress zones 296, such as shown in FIG. 19, are prevented from forming in locations not fully supported by the outer composite shell 36 or by an adjacent liner wall 280, 280' since unsupported high stress zones 296 can result in leaks. In particular, it is desired that high stress zones 296 be spaced apart from the gap 240' in the cavity 220' since liner 20 surrounding this gap 240 has a higher probability of developing leaks.

Figure 20:
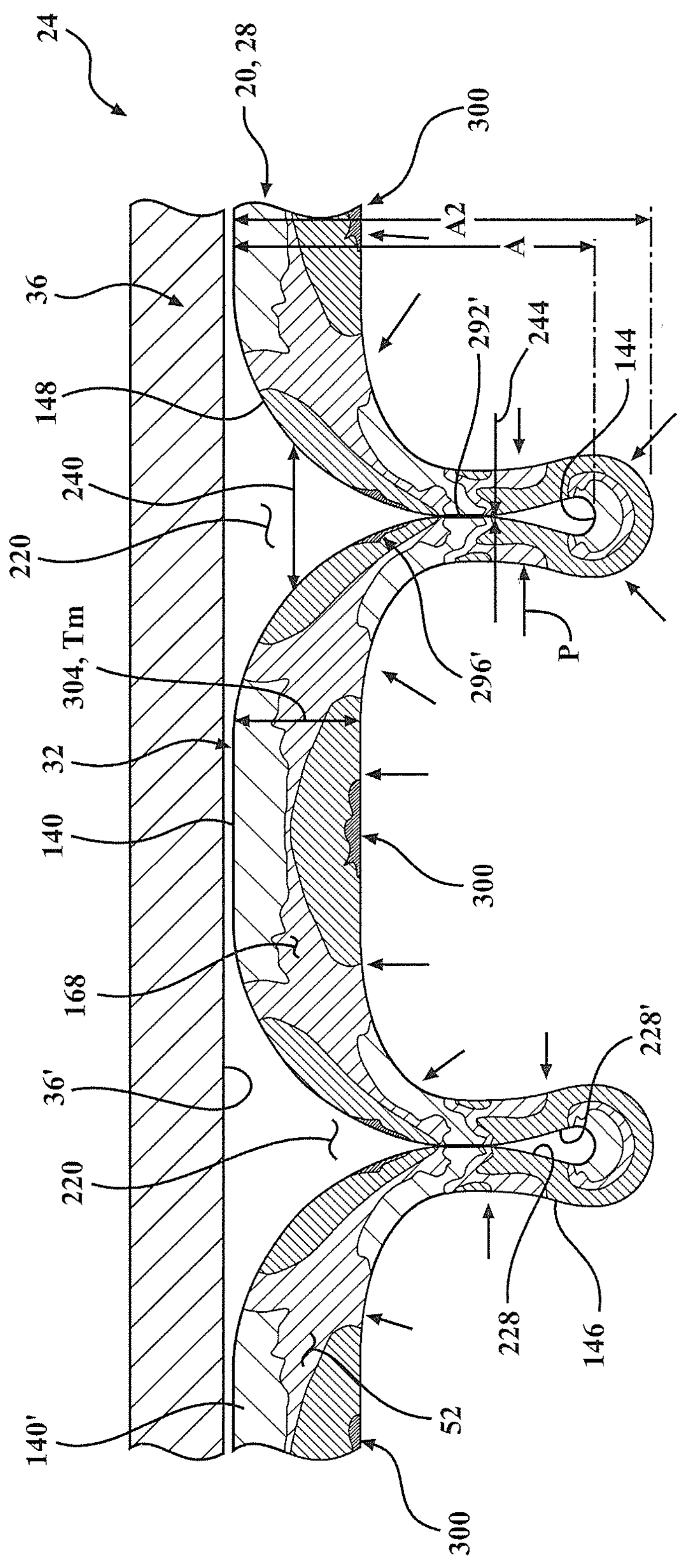
FIG. 20 is an enlarged cross-sectional view of portion 11 of the pressure vessel of FIG. 10 after an inflation process, illustrating maximum stress concentration shortly after self-contact is made.

FIG. 20 shows a cross-sectional view of the pressure vessel 20 having novel corrugations 32 after the liner 20 is covered with the outer composite shell 36, the resin cured to harden the outer composite shell 36, and after inflation causing the liner 20 to make self-contact. In specific, FIG. 20 shows the corrugations 32 after inflation to the point of maximum stress concentration. The point of maximum stress concentration occurs shortly after self-contact between adjacent side walls 228, 228' occurs. During inflation, pressure P is evenly applied along the inner surface 146 of the corrugations 32 when the pressure vessel 24 is pressurized. During inflation, the liner 20 expands to firmly contact the outer composite shell 36. In specific, after inflation the novel corrugation 32 is supported on the outer diameter 76 by the rigid outer composite shell 36.

Since the side walls 228, 228' of the valley 144 are not fully supported by the outer composite shell 36, when the pressure P is elevated above the resistive strength of the corrugation 32 during inflation, the side walls 228, 228' will collapse towards each other until the side walls 228, 228' make contact with the opposing side wall 228', 228 and closing the gap 244 in the cavity 220. In essence, the novel corrugation 32 is inflated onto itself 32 for support during the inflation process. The side walls 228, 228' have a contact point 292' midway up the side wall 228, 228' as shown in FIG. 20. Once the side walls 228, 228' abut the adjacent side wall 228', 228 at contact point 292', both side walls 228, 228 are evenly supported by the opposing side wall 228', 228. It is desirable to collapse the side walls 228, 228' until the side walls 228, 228' are in contact with the opposing side wall 228', 228 since the side walls 228, 228' are evenly supported after the collapse.

Further, it is desirable that the side walls 228, 228' shown in FIG. 20 initiate collapse towards the adjacent side wall 228', 228 at a low value of pressure P since the amount of strain on the liner wall 52 is related to the pressure level P applied. The novel corrugations 32 are configured to minimize the amount of pressure P required to cause the collapse of the side walls 228, 228'. In specific, the valley 144 width Wv of the novel corrugation 32 of FIG. 8 is reduced in comparison to the valley 276 width Wv' of the traditional corrugation 260 shown in FIG. 15.

Further, the valley 276 has a profile 172 that has a radius Rv extending between adjacent side walls 228, 228', as shown in FIG. 8. While the valley 276 can include a flat segment 212, such as shown in FIG. 9, the width 212' of the flat segment 212 is restricted to equal to less than 0.040 times the period T of the novel corrugation 32. If the flat segment 212 is included in the novel corrugation 32, the width 212' of the flat segment 212 is preferably at least 0.12 mm for ease of processing. In contrast, the width Wv' of the flat valley 276 of the traditional corrugation 260 shown in FIG. 15 generally extends across the entire width Wv' of the valley 276. In comparison to the novel corrugation 32 of FIG. 8 and the traditional corrugation 260 of FIG. 15, the radius Rv' between the valley 276 and the side walls 280, 280' of the traditional corrugation 260 is a smaller radius than the radius Rv of the valley 144 of the novel corrugation 32. This results in a sharper corner M2 between the side walls 280, 280' and the valley 276 of the traditional corrugation 260 than the radius Rv between the side walls 228, 228' and the valley 144 of the novel corrugation 32 shown in FIG. 8. The reduction and/or elimination of the flat segment 212 in the valley 144, the reduction in the width Wv of the valley 144, and an increase in radius Rv between the valley 144 and the adjacent side walls 228, 228' effectively decrease the amount of pressure P required to initiate collapse of the side walls 228, 228' of the novel corrugation 32 under pressure.

Turning to FIG. 9, other changes in the novel corrugation 32 that reduce the pressure P required to initiate collapse of the side walls 228, 228' include reducing the amplitude A as well as reducing the wall thickness Tv of the side walls 228, 228' and of the valley 144. As illustrated in FIG. 9, the wall thickness Tm of the ridge 140, 140' is larger than the wall thickness Tv of the valley 144. The wall thickness Ts of the side walls 228, 228', is gradually increased from wall thickness Tv where the side wall 228, 228' joins the valley 144 to the wall thickness Tm at the ridge 140, 140'. The reduced wall thickness Tv in the valley 144 in combination with the tapered side walls 228, 228' reduces the pressure P required to initiate collapse of the side walls 228, 228'. When considering the reaction under pressure for the corrugation 32, the geometric dimensions T, A, Wm, Wv, Tm, Tv describing the shape of the corrugation 32 scale with the tubing outer diameter 76. Generally, the expected bend radius $R_1$, $R_2$ increase as the tube outer diameter 76 increases. Reducing the wall thickness Tm, Tv (up to a minimum thickness of about 0.01 times the outer diameter 76) for larger tubing outer diameters 76 will further reduce the pressure P required to initiate self-contact during inflation. The change in the wall thickness Tm, Tv has a minimal effect on the overall stress on the liner 20 during inflation. If bendability is not a factor, i.e., the bend radii $R_1$, $R_2$ is very large, then the period T does not have to be selected based on the outer diameter 76 of the tubing 20, 28.

Referring to FIG. 20, the amplitude A of the novel corrugation 32 and the amplitude A2 of the traditional corrugation 260 are illustrated for comparison. The amplitude A2 is also shown in FIG. 19 for comparison. The amplitude A of the novel corrugation 32 has been reduced over the amplitude A2 of the traditional corrugation 260. Reducing the amplitude A of the novel corrugation 32 in comparison to the traditional corrugation 260 further reduces the amount of pressure P required to initiate collapse of the side walls 228, 228'. While the side walls 228, 228', 280, 280' of both the novel corrugation 32 and the traditional corrugation 260 collapse under pressure P, P', the amount of pressure P required to initiate collapse of the side walls 228, 228' of the novel corrugation 32 is less than the pressure P' required to initiate collapse of the side walls 280, 280' of the traditional corrugation 260. More specifically, the pressure P required to initiate collapse of the side walls 228, 228' of the novel corrugation 32 is about half of the pressure P' required to initiate collapse of the side walls 280, 280' of the traditional corrugations 260. The reduced pressure P required to initiate collapse of the side walls 228, 228' of the novel corrugation 32 also reduces the strain on the liner wall 52. The reduced strain on the liner wall 52 of the novel corrugation 32 also reduces the probability that the liner 20 will develop a leak.

In summary, increasing the radii Rv, Rm, selecting a moderate amplitude A, selecting a moderate period T, as well as reducing the valley 144 width Wv with respect to the overall period T, results in a reduction in the amount of pressure P required to initiate collapse of the side walls 228, 228' during an inflation process. The reduction in the amount of pressure P required to initiate collapse of the side walls 228, 228' during the inflation process reduces the strain on the liner 20 and reduces the probability of developing leaks. The valley 144 width Wv is reduced to allow the corrugations 32 to interact/collapse at lower pressures P. The width Wv of the valley 144 has an overall minimum value as determined for ease of manufacturing. Selecting a moderate corrugation 32 period T is preferred to maximize the width Wm of the mountain 168. Shortening the mountain 68 width Wm results in increased stress during inflation since the mountain 168 will have reduced surface area in contact with the outer composite shell 36. A moderate amplitude A of the corrugation 32 is preferred to provide sufficient flexibility in the liner wall 52 to allow for self-contact to occur during inflation.

While the changes in the shape of the novel corrugation 32 will reduce the stiffness of the novel corrugation 32 in comparison to the traditional corrugation 260, the reduction in stiffness is offset by the rigid outer composite shell 36 supporting the perimeter of the liner 20. These changes are further offset by the decrease in required pressure P required to initiate collapse of the liner 20 during inflation.

Further examination of the novel corrugation 32 after exposure to pressure P, illustrated in FIG. 20, shows high stress zones 300 are created near the center of the ridge 140 of the novel corrugation 32 on the inner surface 146 of the liner 20. These high stress zones 300 are fully supported by the outer composite shell 36 since these zones 300 are located in the middle of the mountain 168. Further, the magnitude of the stress concentrations in the high stress zones 300 of the novel corrugation 32 is lower than the magnitude of the stress concentrations in the high stress zones 296 of the traditional corrugation 260. In addition, the wall thickness 304, Tm between the inner surface 146 and the outer surface 148 is greatest in this high stress zone 300. The increased wall thickness 304 (in comparison to the side walls 228, 228' and valley 144) in combination with the high stress zone 300 being fully supported by the outer composite shell 36 greatly reduces the probability that the liner 20 will develop blisters, cracks, pin hole leaks, and the like.

Like with the traditional corrugation 260 shown in FIG. 19, high stress zones 296' are created near the transition between the mountain 168 and the side walls 228, 228' of the valley 144 of the novel corrugation 32, as shown in FIG. 20. However, in contrast to the high stress zones 296 created on the inner surface 146' of the traditional corrugation 260 shown in FIG. 19, the high stress zones 296' are located on the outer surface 148 of the novel corrugation 32. The magnitude of stress in the high stress zone 296' of the novel corrugation 32 is significantly less than the magnitude of the stress in the high stress zone 296 of the traditional corrugation 260. The reduction in magnitude of the high stress zone 296' in combination with the stress zone 296' being located on the outer surface 148 of the liner 20 significantly reduces the probability that leak will develop at this location 296'.

Comparing FIGS. 19 and 20, the heavily rounded shape of the novel corrugation 32 of FIG. 20 reduces the number and magnitude of stress concentrations during inflation in comparison to the traditional corrugation 260 shown in FIG. 19. Further, stress concentrations 300 are shifted to the center of the ridge 140, 140' of the novel corrugation 32 where the novel corrugation 32 is fully supported by the rigid outer composite shell 36.

Thus, the novel corrugation 32 shown in FIGS. 8 and 9 is preferred over the traditional corrugation 260 shown in FIG. 15 when the corrugations 32 are part of a liner 20 for a pressure vessel 20. One benefit of the novel corrugation 32 is a reduction in the amount of pressure P required to initiate side wall 228, 228' collapse. A second benefit is high stress zones 296' created during pressurization form along the side walls 228, 228' on the outer surface 148 of the liner 20, reducing the probably of a leak developing in this high stress zone 296'. A third benefit is high stress zones 300 created during pressurization forming on the inner surface 146 of the liner 20 form near the ridge 140, 140' of the mountain 168, where the wall thickness Tm is increased and where the outer surface 148 is fully supported by the outer composite shell 36. A fourth benefit is the bending flexibility (represented by arrow B in FIG. 12) is sufficient to allow for folding of the liner 20 into a pre-determined stacking architecture 120.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A pressure vessel for containing liquids and/or gases under pressure, said pressure vessel comprising:

a polymeric liner comprising a hollow body having a cylindrical wall extending from a first end to an opposing end of said liner, said cylindrical wall having an inner surface and an outer surface, said hollow body including a corrugated section having a cylindrical shape and having annular corrugations providing alternating ridges and valleys arranged from one end to an opposing end of said corrugated section, each of said corrugations comprising a curved mountain region on an outer surface of said corrugation including a ridge extending circumferentially around said hollow body forming an annular mountain ring with a circular-shaped cross section having a first diameter and having a mountain width (Wm), a curved valley on said outer surface of said corrugation between adjacent spaced apart mountain regions and extending circumferentially around said hollow body forming an annular valley ring with a circular-shaped cross section having a second diameter and having a valley width (Wv), wherein said second diameter is less than said first diameter, and a side wall extends radially between and joins each successive mountain region and valley, a distance between successive ridges defines a period (T) of said corrugations, a distance between said inner surface and said outer surface of said liner at said ridge defines a mountain wall thickness (Tm), a distance between said inner surface and said outer surface of said liner at a midpoint of said valley defines a valley wall thickness (Tv), a distance between said inner surface and said outer surface along said side wall defines a sidewall thickness (Ts), which transitions from said valley wall thickness (Tv) to said mountain wall thickness (Tm), and a radial distance between said outer surface at said ridge and said outer surface at said valley defines an amplitude (A) of said corrugations, wherein said corrugated section defines an arcuate shape between said opposing ends thereof; and a rigid outer composite shell comprising cured resin and fiber surrounding an outer periphery of said liner supporting said outer surface of said ridges and spaced apart from said valleys and including an annular cavity bounded by said outer surface of said liner forming said side walls of each said valley and a lower surface of said outer composite shell;

wherein said mountain wall thickness Tm is at least 0.5 mm and less than or equal to 1.2 mm, said valley wall thickness Tv is at least 0.3 mm and less than said mountain wall thickness Tm, and said valley width Wv is less than said mountain width Wm such that said valley has a first pressure level of a pressure applied to said inner surface of said liner to initiate collapse of said valley which is lower than a second pressure level to initiate collapse of said mountain region when said liner collapses in response to pressurization of said pressure vessel, said amplitude A is greater than or equal to 0.65 times said period T and less than or equal to 0.75 times said period T of said corrugations, and said valley wall thickness Tv is less than or equal to 0.27 times said amplitude A of said corrugations; and wherein said adjacent side walls extending from said valley are exposed to said pressure on said inner surface thereof and collapse into said annular cavity towards each other until each said adjacent side wall is in contact with the other of said adjacent side walls closing said annular cavity in response to pressurizing said pressure vessel at said first pressure level and inflation of said polymeric liner.

2. The pressure vessel as set forth in claim 1, wherein:

said mountain wall thickness Tm is less than or equal to 0.32 times the amplitude A of said corrugations.

3. The pressure vessel as set forth in claim 2, wherein:

said upper surface of said mountain region is defined by a radius Rm such that said mountain region has a curved upper surface; and said curved upper surface of said mountain region having a radius Rm greater than or equal to 0.40 times the period T and less than or equal to 0.45 times the period T of said corrugations.

4. The pressure vessel as set forth in claim 3, wherein:

said upper surface of said valley is defined by a radius Rv such that said valley has a curved upper surface.

5. The pressure vessel as set forth in claim 4, wherein: said valley includes a flat segment centered on said midpoint of said valley, said flat segment having a width less than or equal to 0.040 times said period T of said corrugations.

6. The pressure vessel as set forth in claim 4, wherein: said period T of said corrugations is greater than or equal to 0.135 times the outer diameter OD of said ridge and less than or equal to 0.165 times the outer diameter OD of said ridge.

7. The pressure vessel as set forth in claim 6, wherein: said amplitude A of said corrugations is greater than or equal to 2.15 mm and less than or equal to 2.35 mm, an inner diameter defined on said inner surface of said liner at said midpoint of said valley is greater than or equal to 15.6 mm and less than or equal to 16.2 mm, said period T of said corrugations is greater than or equal to 3.1 mm and less than or equal to 3.3 mm, said mountain region having an upper surface contour defined by said radius Rm of 1.3 mm, and valley having an upper surface contour defined by said radius Rv of 0.16 mm.

8. The pressure vessel as set forth in claim 7, wherein: said polymeric liner comprises one or more of Nylon, ethylene-vinyl acetate (EVA), linear low density polyethylene (LLDPE), low-density polyethylene (LDPE), high density polyethylene (HDPE), polypropylene (PP), ethylene vinyl alcohol (EVOH), polytetrafluoroethylene (PTFE), polyurethane (PU), and/or polyvinyl chloride (PVC).

9. The pressure vessel as set forth in claim 8, wherein said resin of said outer composite shell comprises one or more of an epoxy resin, a vinylester resin, a thermoplastic resin, a polyester resin, and/or urethane.

10. The pressure vessel as set forth in claim 9, wherein said fiber of said outer composite shell is one or more of carbon fiber, aramid fiber, polyester fiber, polyethylene fiber, Nylon fiber, a metal, and/or glass fiber.

11. A pressure vessel for containing liquids and/or gases under pressure, said pressure vessel comprising:

a polymeric liner comprising a hollow body having a cylindrical wall extending from a first end to an opposing end of said liner, said cylindrical wall having an inner surface and an outer surface, said hollow body including a corrugated section having a cylindrical shape aligned with a longitudinal axis and having annular corrugations providing alternating ridges and valleys extending circumferentially around said corrugated section and arranged from one end to an opposing end of said corrugated section, each of said corrugations comprising a curved mountain region on an outer surface of said corrugation including a ridge extending circumferentially around said hollow body forming an annular ring with a circular-shaped cross section having a first radius from said longitudinal axis and having a mountain width (Wm) along said longitudinal axis, a curved valley on said outer surface of said corrugation between adjacent spaced apart mountain regions and extending circumferentially around said hollow body forming a valley ring with a circular-shaped cross section having a second radius from said longitudinal axis and having a valley width (Wv) along said longitudinal axis, wherein said second radius is less than said first radius, and said liner including a side wall, which extends radially between and joins each successive mountain region and valley with adjacent side walls being disposed in opposing relation on opposite sides of a respective valley defined therebetween, wherein a distance between successive ridges defines a period (T) of said corrugations, a distance between said inner surface and said outer surface of said liner at said ridge defines a mountain wall thickness (Tm), a distance between said inner surface and said outer surface of said liner at a midpoint of said valley defines a valley wall thickness (Tv), a distance between said inner surface and said outer surface of said liner along said side wall defines a side wall thickness (Ts), which transitions from said valley wall thickness (Tv) to said mountain wall thickness (Tm), a radial distance between said outer surface at said ridge and said outer surface at said valley defines an amplitude (A) of said corrugations, and said corrugated section defines an arcuate shape between said opposing ends thereof; and a rigid outer composite shell comprising cured resin and fiber surrounding an outer periphery of said liner supporting said outer surface of said ridges and spaced apart from said valleys wherein an annular cavity is defined between said outer surface of said adjacent side walls and between said outer composite shell and said outer surface of said valley;

wherein said valley wall thickness Tv is less than said mountain wall thickness Tm and said valley width Wv is less than said mountain width Wm such that initiation of collapse of said valley in response to pressurization of said pressure vessel with a pressure will occur at a first pressure level, initiation of collapse of said mountain region in response to pressurization of said pressure vessel with said pressure will occur at a second pressure level, and said first pressure level is less than said second pressure level; and wherein said adjacent side walls extending from said valley are exposed to said pressure on said inner surface thereof and collapse towards each other closing said annular cavity in response to pressurizing said pressure vessel at said first pressure level and inflation of said polymeric liner.

12. The pressure vessel as set forth in claim 11, wherein said mountain wall thickness Tm is at least 0.5 mm and less than or equal to 1.2 mm and said valley wall thickness Tv is at least 0.3 mm and less than said mountain wall thickness Tm.

13. The pressure vessel as set forth in claim 12, wherein said amplitude A is between 0.65 times said period T and 0.75 times said period T of said corrugations, said valley wall thickness Tv is less than or equal to 0.27 times the amplitude A of said corrugations, and said mountain wall thickness Tm is less than or equal to 0.32 times the amplitude A of said corrugations.

14. The pressure vessel according to claim 11, wherein said side wall thickness (Ts) is greater than said valley thickness (Tv) and progressively increases radially outwardly toward said mountain region while being less than said mountain thickness (Tm), which governs collapsing of said adjacent sidewalls relative to said valley and said mountain region.

15. A pressure vessel for containing liquids and/or gases under pressure, said pressure vessel comprising:

a polymeric liner comprising a hollow body having a cylindrical liner wall extending from a first end to an opposing end of said liner, said liner wall having an inner surface and an outer surface, said hollow body including a corrugated section having a cylindrical shape aligned with a longitudinal axis and having circumferential annular corrugations providing alternating ridges and valleys extending circumferentially around said corrugated section and arranged from one end to an opposing end of said corrugated section, each of said corrugations comprising a curved mountain region on an outer surface of said corrugation including a ridge extending circumferentially around said hollow body forming an annular ring with a circular-shaped cross section having a first radius from said longitudinal axis and having a mountain width Wm along said longitudinal axis, said first radius being uniform about a full extent of said annular ring, each of said corrugations further comprising a curved valley on said outer surface of said corrugation between adjacent spaced apart mountain regions and extending circumferentially around said hollow body forming a valley ring with a circular-shaped cross section having a second diameter radius from said longitudinal axis and having a valley width Wv along said longitudinal axis, said second radius being uniform about a full extent of said valley ring, wherein said second radius is less than said first radius, and said liner including a side wall, which extends radially between and joins each successive mountain region and valley wherein adjacent said side walls are disposed in opposing relation on opposite sides of a respective said valley defined therebetween, wherein a distance between successive ridges defines a period (T) of said corrugations, a distance between said inner surface and said outer surface of said liner at said ridge defines a mountain wall thickness (Tm), a distance between said inner surface and said outer surface of said liner at a midpoint of said valley defines a valley wall thickness (Tv), a distance between said inner surface and said outer surface of said liner along said side wall defines a side wall thickness (Ts), which transitions from said valley wall thickness (Tv) to said mountain wall thickness (Tm), a radial distance between said outer surface at said ridge and said outer surface at said valley defines an amplitude (A) of said corrugations, and said corrugated section defines an arcuate shape between said opposing ends thereof; and a rigid outer composite shell comprising cured resin and fiber surrounding an outer periphery of said liner supporting said outer surface of said ridges and spaced apart from said valleys wherein an annular cavity is defined longitudinally between said outer surface of said adjacent side walls and radially between an inner shell surface of said outer composite shell and said outer surface of said valley;

wherein said valley wall thickness (Tv) is less than said mountain wall thickness (Tm) and said valley width (Wv) is less than said mountain width (Wm) such that initiation of collapse of said valley in response to pressurization of said pressure vessel with an internal liner pressure will occur at a first pressure level, initiation of collapse of said mountain region in response to pressurization of said pressure vessel with said internal liner pressure will occur at a second pressure level, and said first pressure level is less than said second pressure level; and wherein said adjacent side walls extending from said valley are exposed to said internal liner pressure on said inner surface thereof and collapse towards each other closing said annular cavity in response to pressurizing said pressure vessel at said first pressure level, and further wherein said mountain region is exposed to said internal liner pressure on said inner surface thereof and collapses radially outwardly into supported contact with said liner in response to pressurizing said pressure vessel at said second pressure level, wherein said valley wall thickness (Tv) and said mountain wall thickness (Tm) are defined such that collapsing of said adjacent side walls defines a concentrated pressure zone on the outer surface of said liner in an outer area of contact between said adjacent side walls, and collapsing of said mountain region radially outwardly defines a concentrated pressure zone on an inner area of said inner surface of said mountain region opposite to an outer area of said mountain region supported by said outer composite shell.

16. The pressure vessel as set forth in claim 15, wherein said concentrated pressure zone on said inner surface of said mountain region is created near said ridge thereof.

17. The pressure vessel as set forth in claim 15, wherein said mountain thickness (Tm) is greater than said valley thickness (Tv) to define said first pressurization level at which said adjacent side walls collapse toward each and define said second pressurization level at which said mountain region collapses towards said outer composite shell.

18. The pressure vessel as set forth in claim 15, wherein said mountain wall thickness (Tm) is at least 0.5 mm and less than or equal to 1.2 mm and said valley wall thickness (Tv) is at least 0.3 mm and less than said mountain wall thickness (Tm) to govern said formation of said concentrated pressure zones.

19. The pressure vessel as set forth in claim 15, wherein said amplitude A is between about 0.65 times said period T and about 0.75 times said period T of said corrugations, said valley wall thickness (Tv) is less than or equal to about 0.27 times the amplitude (A) of said corrugations, and said mountain wall thickness (Tm) is less than or equal to about 0.32 times the amplitude (A) of said corrugations to govern said first pressure level and said second pressure level and govern formation of said concentrated pressure zones.

* * * * *